(12) United States Patent
Anderson

(10) Patent No.: US 7,593,738 B2
(45) Date of Patent: Sep. 22, 2009

(54) GPS SYNCHRONIZATION FOR WIRELESS COMMUNICATIONS STATIONS

(75) Inventor: Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 374 days.

(21) Appl. No.: 11/321,893

(22) Filed: Dec. 29, 2005

(65) Prior Publication Data

US 2007/0161385 A1    Jul. 12, 2007

(51) Int. Cl.
*H04W 24/00*     (2009.01)
*H04B 17/00*     (2006.01)
*H04J 3/06*      (2006.01)
*H04B 7/212*     (2006.01)
*G01S 1/00*      (2006.01)
*H04B 15/00*     (2006.01)

(52) U.S. Cl. .............. 455/456.1; 455/456.3; 455/456.5; 455/456.6; 455/67.11; 455/502; 370/509; 370/510; 370/321; 370/324; 370/350; 370/503; 342/357.12

(58) Field of Classification Search ............. 455/456.1, 455/456.5, 502, 67.11; 370/509, 510, 321, 370/324, 350, 503; 342/357.12
See application file for complete search history.

(56) References Cited

U.S. PATENT DOCUMENTS

| | | | |
|---|---|---|---|
| 4,728,959 A | 3/1988 | Maloney et al. | 342/457 |
| 5,327,144 A | 7/1994 | Stilp et al. | 342/387 |
| 5,327,429 A * | 7/1994 | Dartois et al. | 370/350 |
| 5,608,410 A | 3/1997 | Stilp et al. | 342/387 |
| 5,959,580 A | 9/1999 | Maloney et al. | 342/457 |
| 6,047,192 A | 4/2000 | Maloney et al. | 455/456.2 |
| 6,091,362 A | 7/2000 | Stilp et al. | 342/465 |
| 6,097,336 A | 8/2000 | Stilp | 342/357.02 |
| 6,101,178 A | 8/2000 | Beal | 370/336 |
| 6,108,555 A | 8/2000 | Maloney et al. | 455/456.2 |
| 6,115,599 A | 9/2000 | Stilp | 455/404.1 |
| 6,119,013 A | 9/2000 | Maloney et al. | 455/456.2 |
| 6,127,975 A | 10/2000 | Maloney | 342/457 |
| 6,172,644 B1 | 1/2001 | Stilp | 342/457 |
| 6,184,829 B1 | 2/2001 | Stilp | 342/387 |
| 6,266,013 B1 | 7/2001 | Stilp et al. | 342/387 |
| 6,281,834 B1 | 8/2001 | Stilp | 342/174 |
| 6,285,321 B1 | 9/2001 | Stilp et al. | 342/465 |
| 6,288,675 B1 | 9/2001 | Maloney | 342/457 |
| 6,288,676 B1 | 9/2001 | Maloney | 342/457 |
| 6,317,081 B1 | 11/2001 | Stilp | 342/387 |
| 6,317,604 B1 | 11/2001 | Kovach, Jr. et al. | 455/456.5 |

(Continued)

OTHER PUBLICATIONS

CDMA—EIA/TIA Standard IS-95A; ANSI J-STD-008; May 1995.

(Continued)

*Primary Examiner*—Rafael Pérez-Gutiérrez
*Assistant Examiner*—Allahyar Kasraian
(74) *Attorney, Agent, or Firm*—Woodcock Washburn LLP

(57) ABSTRACT

A method and system are specified to determine, provide, and exploit the precise time base relations between the distinct signal timings of the Global Positioning System (GPS) and a wireless communications system (WCS) for which the internal WCS downlink time base standards are not inherently synchronized to GPS timing. These downlink signal synchronization facilities are particularly beneficial for a wireless location system (WLS) and related methods and subsystems that provide mobile-station location determination through the exploitation of the time base synchronization information, e.g., to assist a GPS-equipped mobile station in determining its GPS-derived measurements with enhanced efficiency and accuracy.

2 Claims, 4 Drawing Sheets

U.S. PATENT DOCUMENTS

| | | | |
|---|---|---|---|
| 6,334,059 B1 | 12/2001 | Stilp et al. | 455/404.2 |
| 6,349,207 B1 * | 2/2002 | Monot et al. | 455/423 |
| 6,351,235 B1 | 2/2002 | Stilp | 342/357.06 |
| 6,366,241 B2 | 4/2002 | Pack et al. | 342/442 |
| 6,388,618 B1 | 5/2002 | Stilp et al. | 342/457 |
| 6,400,320 B1 | 6/2002 | Stilp et al. | 342/457 |
| 6,463,290 B1 | 10/2002 | Stilp et al. | 455/456.1 |
| 6,483,460 B2 | 11/2002 | Stilp et al. | 342/457 |
| 6,492,944 B1 | 12/2002 | Stilp | 342/387 |
| 6,519,465 B2 | 2/2003 | Stilp et al. | 455/456.1 |
| 6,546,256 B1 | 4/2003 | Maloney et al. | 455/404.2 |
| 6,563,460 B2 | 5/2003 | Stilp et al. | 342/457 |
| 6,603,428 B2 | 8/2003 | Stilp | 342/357 |
| 6,646,604 B2 | 11/2003 | Anderson | 342/465 |
| 6,661,379 B2 | 12/2003 | Stilp et al. | 342/457 |
| 6,728,264 B1 | 4/2004 | Kumagai et al. | 370/468 |
| 6,765,531 B2 | 7/2004 | Anderson | 342/378 |
| 6,771,265 B1 | 8/2004 | Shimono | 345/426 |
| 6,782,264 B2 | 8/2004 | Anderson | 455/456.1 |
| 6,873,290 B2 | 3/2005 | Anderson et al. | 342/457 |
| 6,876,859 B2 | 4/2005 | Anderson et al. | 455/456.1 |
| 7,215,967 B1 * | 5/2007 | Kransmo et al. | 455/456.2 |
| 7,236,746 B2 * | 6/2007 | Peric | 455/67.11 |
| 7,330,732 B2 * | 2/2008 | Wilborn et al. | 455/502 |
| 2001/0016490 A1 * | 8/2001 | Martin-Leon et al. | 455/424 |
| 2002/0123352 A1 | 9/2002 | Vayanos et al. | 455/456 |
| 2003/0216142 A1 * | 11/2003 | Wigren | 455/456.1 |
| 2004/0120386 A1 * | 6/2004 | Grilli et al. | 375/148 |
| 2004/0198394 A1 | 10/2004 | Syrjarinne et al. | 455/456.1 |
| 2005/0148346 A1 | 7/2005 | Maloney et al. | 455/456.6 |
| 2005/0180351 A1 * | 8/2005 | Peric | 370/328 |

OTHER PUBLICATIONS

Ianiello, J. P. et al., "*Time Delay Estimation Via Cross-Correlation in the Presence of Large Estimation Errors*," IEEE Trans. Acoust., Speech, Signal Processing, Dec. 1982, vol. ASSP-30, No. 6, 998-1003.

Knap, C. H. et al., "*The Generalized Correlation Method for Estimation of Time Delay*," IEEE Trans. Acoust., Speech, Signal Processing, Aug. 1976, vol. ASSP-24, No. 4, 320-327.

"Technical Specification Group Services and System Aspects Service Aspects; Service Principles," Third Generation Partnership Project (3GPP), 2005, 7.4.0, 45 pages.

* cited by examiner

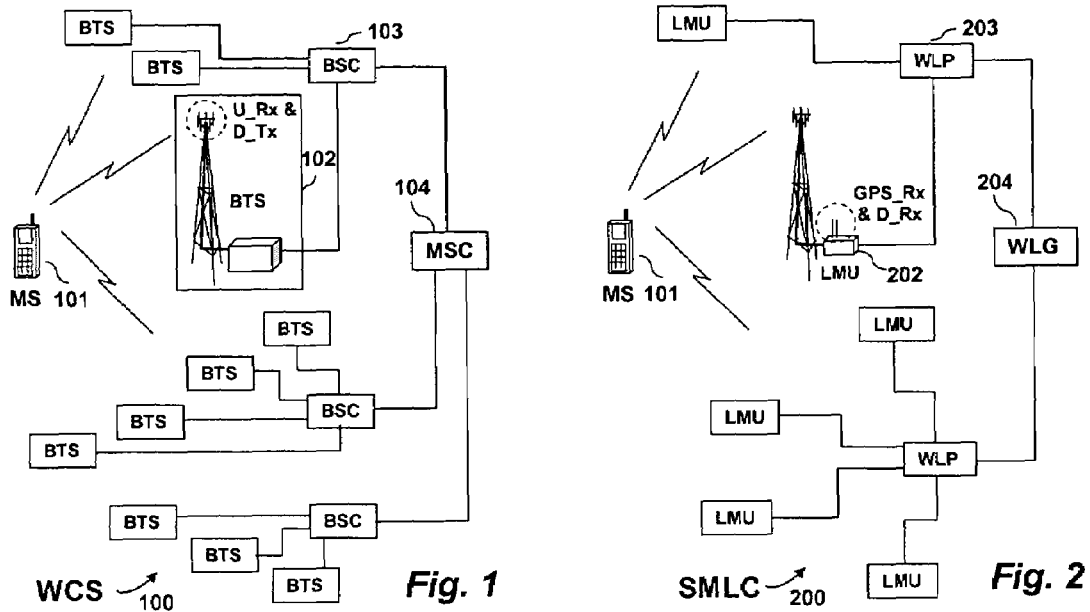
Fig. 1
Fig. 2
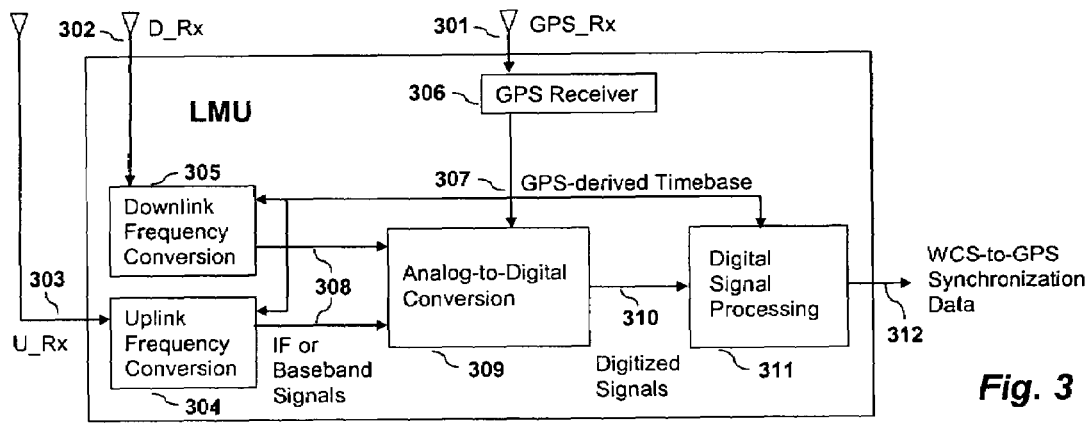
Fig. 3
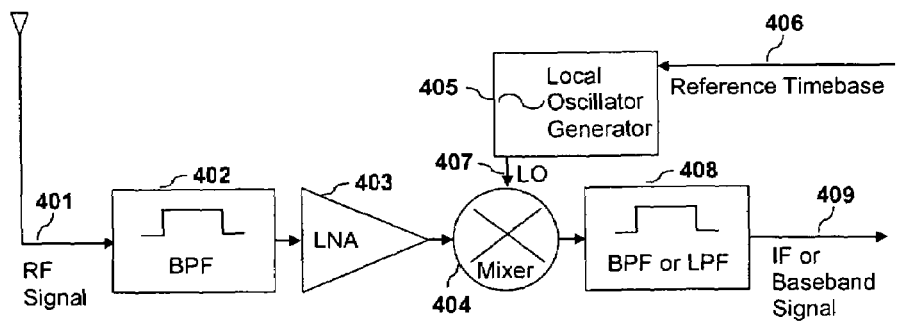
Fig. 4

GPS SYNCHRONIZATION FOR WIRELESS COMMUNICATIONS STATIONS

TECHNICAL FIELD

The present invention relates generally to facilities to determine, provide, and exploit the precise time base relations between the distinct signal timings of the Global Positioning System (GPS) and those of a wireless communications system (WCS) for which the internal WCS time base standards are not inherently synchronized to GPS timing. Some of the exemplary aspects of the present invention are particularly beneficial for a wireless location system (WLS) and related methods and subsystems that provide mobile-station location determination through the exploitation of the time base synchronization information, e.g., to assist a GPS-equipped mobile station in determining its GPS-derived measurements with enhanced efficiency and accuracy. It should be noted, however, that although aspects of the systems and methods described herein relate specifically to operational technologies for the benefit of wireless location systems, the claims at the end of this specification are not to be construed as limited to applications to wireless location systems, except as they may be explicitly so limited.

BACKGROUND

The present invention determines, provides, and applies a precise GPS-standardized time base synchronization representation for the signals transmitted from the base transceiver stations (BTSs) of a cellular wireless communications system (WCS), for which the BTSs are not inherently and jointly synchronized to a common time base standard. In particular, the BTSs of currently primary interest are the cellular wireless transceiver stations serving routine or typical operations under an ETSI- or 3GPP-specified WCS, including those implemented for GSM and UMTS service.

As realized and noted in the background art for wireless communications systems, the timing of a 3GPP-specified BTS's transmitted signal is managed to provide transmitted signal frequencies that are within specified acceptance criteria of the nominal system-defined communications-channel frequencies. The time base tolerance for the WCS facilities is intended to permit acceptable communications performance involving any independently manufactured and distinctly compliant BTS and mobile station/user equipment (MS/UE). However, under the 3GPP specifications, neither the BTSs nor the MS/UEs must be jointly synchronized in common to any worldwide or area-wide time base standard. The compliant time base clock or oscillator for each BTS is specified to operate within the acceptable criteria for the nominal oscillator frequency, but otherwise operates independently from that for any other BTS. The compliant MS/UE time base clock or oscillator is also required to independently operate within specified criteria, to facilitate initial acquisition of the BTS downlink channel transmissions. Thereafter the MS/UE synchronizes itself to its reception of the serving BTS-transmitted frequency and communications frame synchronization time base, and then applies any received command for a timing-advance (TA) parameter relative to this detected time base. Thus inter-BTS co-synchronization is not required for the 3GPP wireless communications.

An objective of the present invention is to provide the technology for automated determination of the precise GPS-based time synchronization or "time tag/label" for specific instants, e.g., the digital frame boundaries, in the downlink signals transmitted by the wireless communications BTSs. In its enhanced performance contrasted with descriptions of the background art, the present invention achieves high accuracy in the GPS-based BTS-timing characterization through the evaluation and analysis of the downlink communications signals transmitted by the BTS. In accord with the applicable technical specifications for the "digital" WCS communications protocols, the digital data communicated between a BTS and the mobile units that it serves are organized into successive communications "frames," with each frame comprising sets of "overhead" or "control" bits and the communicated "message" bits constituting the communications of interest to the served parties. These communications frames and their encapsulated data bits are transmitted at the specified data transmission rate and are modulated upon the specified transmission-frequency carrier in accord with the time base standard or oscillator that drives the electronics of the transmitting unit(s).

In a GSM or UMTS WCS, the time base for each individual BTS must meet a specification standard for tolerance around a nominal frequency, but otherwise the individual BTS timebases may and typically do operate independently, without inter-station synchronization. To enhance the services enabled through such synchronization, the technology of the present invention provides the precise determination of the temporal relationship between the BTS's self-generated time base/clock and the worldwide GPS time base, in a manner to precisely measure and evaluate the GPS-standardized time for the BTS transmitted signal at the communications frame boundary. The derived WCS BTS-to-GPS synchronization information of the present invention is used to support the enhanced performance of services that exploit the information obtained via precisely timed signal reception.

Examples of the background art for WCS protocols are available in the descriptions of the specified technologies for various wireless communications systems. E.g., a (North American, NA) Code Division Multiple Access (CDMA) WCS, as specified in EIA/TIA IS-95, operates with all of its BTSs simultaneously and individually synchronized to the GPS time base standard. Alternatively, BTSs deployed and operating in compliance with the 3GPP WCS technical specifications (TSs) for the Global System for Mobile communications (GSM) or the Universal Mobile Telecommunications System (UMTS) do not require, and do not typically implement, any such equivalent inter-BTS co-synchronization. Rather, the 3GPP specifications merely require the independent time base oscillator or clock for each cell sector to operate at a nominal specified standard frequency, to within the required tolerance for the standard BTSs.

Examples of the background art for the complimentary augmentation of WCS facilities are available in the descriptions of systems that determine the accurate location of the MS/UEs operating in standard configuration under normal WCS protocols and procedures. TruePosition, Inc., the assignee of the present invention, and its affiliates have been developing and deploying such wireless location system (WLS) facilities for many years, and a list below describes a multitude of its related patented technologies. As examples of related background art, the station-based WLS processing described in U.S. Pat. No. 6,285,321 and the matched-replica WLS signal processing described in U.S. Pat. No. 6,047,192 both employ correlative signal TOA determinations through the signal processing and analysis of uplink signals transmitted by MS/UEs. Additionally U.S. Pat. No. 6,388,618 describes the use of GPS-synchronized WLS location measurement units (LMUs), called therein signal collection systems (SCSs), for correlated analysis of uplink MS/UE signals. Further U.S. Pat. No. 6,351,235 thoroughly describes methods, procedures, and mechanisms for establishing a geographically distributed network of (WLS) local measurement units (LMUs or SCSs) that are all precisely and accurately synchronized to the GPS time base standard with an enhanced degree of stability. Finally U.S. Pat. No. 6,782,264 presents facilities for monitoring WCS A-bis interface messaging to cue and support WLS location determination operations. The descriptions for this A-bis Monitoring System (AMS) also suggest a cooperative mechanism for approximate BTS synchronization, through exploitation of the signal processing facilities that are inherent for the infrastructure-based WLS's processing of the uplink signals transmitted by MS/UEs.

The technology of the present invention provides precise and accurate synchronization information for any BTS of sufficiently detectable downlink signal strength, to within expected (e.g., Cramer-Rao and/or Ziv-Zakai) signal-processing accuracy bounds/limits. This technology applies the GPS-based synchronization implemented among a (WLS) deployed network of local signal measurement units to provide the common precise time base for the determination of the GPS-time base registration or relationship to BTS downlink transmissions detectable among the WCS network stations. The resultant precisely determined BTS time base relationship to the GPS time standard enables synchronized AGPS support to GPS-equipped MS/UEs, as well as synchronized MS/UE (uplink) signal data collection, with enhanced accuracy and efficiency for optimal WLS performance. Through the cost-effective application of the technology of the present invention, an adapted form of WLS synchronized signal data collection facilities provides the inventive derivation of the relations between the BTS downlink communications signal timebases and the GPS time standard. No uplink correlative signal analyses for timing determinations need be applied.

None of the background art descriptions of WCS or WLS technologies teach, provide, or describe the technology for downlink signal reception, evaluation, and analysis for the derivation of WCS BTS-to-GPS synchronization information. In contrast with the background art, including that referenced above, the technologies disclosed below integrate and exploit the GPS-synchronized collection and evaluation of BTS downlink signals to optimally determine, provide, and exploit the measured time relationship between the communications signal timebases, as observed for BTS frame boundaries, and the worldwide GPS time standard. Through the adaptations described below, the inventive methods and procedures presented herein can be integrated into, and applied in augmentation of and conjunction with, WLS facilities that are intended to be involved in the processing and analysis of uplink MS/UE transmitted signals. In such a multi-use configuration, the implementation and deployment of the present invention is particularly cost effective in its sharing of the applicable signal and data processing resources.

SUMMARY

The following summary provides an overview of various aspects of exemplary implementations of the invention. This summary is not intended to provide an exhaustive description of all aspects of the invention, or to define the scope of the invention. Rather, this summary is intended to serve as an introduction to the following description of illustrative embodiments.

The present invention provides the technology for determining precise standardized time base synchronization information regarding the downlink signals transmitted from the base transceiver stations (BTSs) of a wireless communications system (WCS), for which the BTSs are not inherently synchronized to a common time base standard. One goal of the present invention is to provide the technology for automated determination of the precise GPS-based time synchronization for the digital-data frame boundaries in the downlink signals transmitted by the wireless communications BTSs. In particular, the present invention applies a network of signal reception, processing, and measurement units, which are themselves accurately synchronized with the GPS time base, to detect the WCS downlink signals of interest transmitted by the otherwise unsynchronized BTSs. The signal measurement units evaluate the received WCS downlink signals and determine the time base relationship for each BTS signal relative to the time base standard of the GPS. The derived BTS-to-GPS time base relations can be applied for the enhancement of the operations of a wireless location system (WLS), which applies the relations in providing assisted GPS (AGPS) timing data for the location-related measurements of GPS-enabled mobile stations/user equipment (MS/UE) and in achieving WLS time-synchronized uplink signal collections from MS/UEs served by distant remote BTSs.

For the technology of the present invention, an exemplary embodiment for the network of such signal measurement units may be applied with use of an infrastructure-based WLS that is deployed for the determination of the locations of the WCS MSs/UEs, which are served by the WCS. As described in the background art, such a WLS may typically comprise a network of location measurement units (LMUs) that receive and process uplink MS/UE signals to extract measurements associated with, and exploited for the determination of, the source geographic locations of the associated MS/UEs. With a particular form of WLS that performs signal time of arrival (TOA) or time difference of arrival (TDOA) measurements for the MS/UE location determinations, the multiple LMUs distributed throughout the operational domain of the WCS are implemented with mechanisms for accurate co-synchronization of the time base for all LMUs to a common precise standard. Currently the most cost-effective and precisely accurate worldwide time base standard of typical use in a WLS is the GPS time standard. Thus, as described for the background art, an embodiment of a TOA-focused WLS is typically implemented with LMUs that receive and capture transmitted uplink MS/UE signals, with precise time-tagging of the signals collected at the LMUs being coordinated and "clocked" in synchronization with a time base standard (i.e., a signal oscillator) that is "driven by" or "locked to" the GPS time standard. A network of an adapted form of such facilities provides an efficient and cost-effective embodiment for the technologies of the present invention.

To provide the enhanced performance for GPS-synchronized augmenting services, including AGPS location services enabled with a GPS-supported WLS, the technology of the present invention effectively and accurately determines and uses the GPS synchronization for the downlink signals emitted by the BTSs. This GPS-synchronization representation for independent BTS timebases is determined through the exploitation of WLS signal collection capabilities in its LMUs, or through a distributed network of similar such signal collection and measurement units that could be termed "local measurement units" (LMUs). In an example implementation of the present invention, the synchronization accuracy and the signal analysis capabilities of the time-critical WLS facilities in a network of adapted BTS-receiving LMUs are applied and exploited in the measurement of times of arrival (TOA) for BTS downlink signals, to derive the GPS-based timing of the BTS transmitted signals themselves. For a WCS frame boundary identified as a signature instant of the downlink BTS signal, the inventively measured TOA of such an instant is appropriately adjusted with proper account for the signal propagation from the point of BTS transmission, through the environment and the LMU signal acquisition and conditioning components, to the point of LMU received-signal time tagging. The adjusted time value thereby represents the GPS-synchronized BTS time of transmission (TOT). The resultant derived BTS-to-GPS synchronization information is then provided to an augmenting service, such as the MS location-determination service of a WLS.

These and other innovative approaches of the present invention for enhanced determination and exploitation of the GPS synchronization for WCS transmitted signals are presented in the detailed description that follows.

BRIEF DESCRIPTION OF THE DRAWINGS

The foregoing summary, as well as the following detailed description, is better understood when read in conjunction with the appended drawings. For the purpose of illustrating the invention, there is shown in the drawings exemplary constructions of the invention; however, the invention is not limited to the specific methods and instrumentalities disclosed.

FIG. 1 depicts a representative configuration of the major components of a wireless communications system (WCS).

FIG. 2 shows a representative configuration of the major components of an overlay wireless location system (WLS), otherwise termed the serving mobile location center (SMLC).

FIG. 3 illustrates the major relevant components of an adapted SMLC/WLS location measurement unit (LMU), which units are distributed throughout the operational domain served by a WLS.

FIG. 4 represents the primary components for an RF signal frequency-conversion unit of FIG. 3, which unit appropriately conditions the signal for subsequent signal acquisition and processing.

DETAILED DESCRIPTION OF ILLUSTRATIVE EMBODIMENTS

A. Overview

Figure 5:
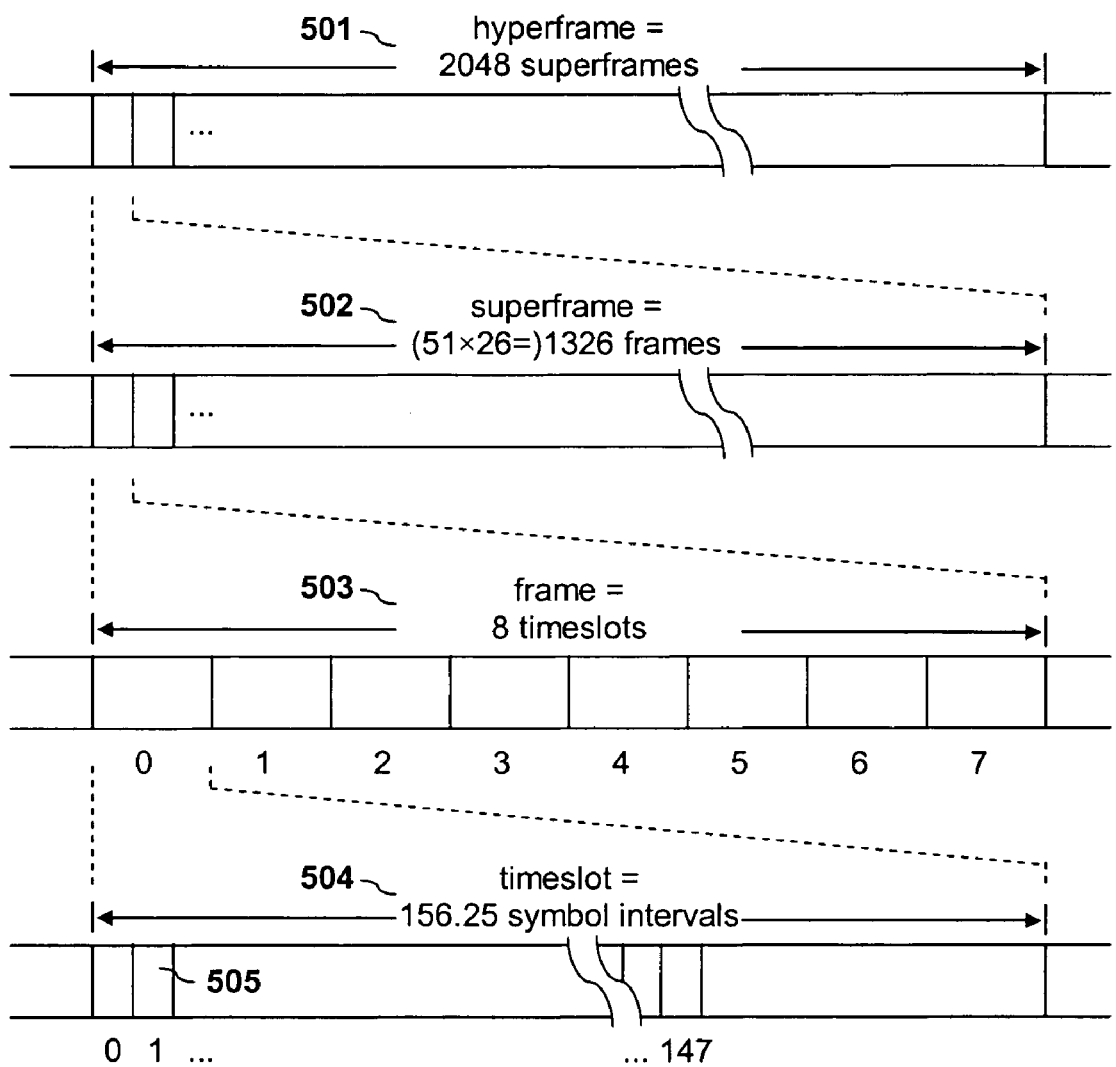
FIG. 5 represents the organization of a typical temporal sequence for the frames and bit symbols transmitted under a GSM WCS BTS.

A presently preferred embodiment of the invention exploits the information capable of being provided via a location measurement unit (LMU), such as that of a standard or augmented wireless location system (WLS), to derive the synchronization relationship between the downlink signal transmitted by a 3GPP-specified wireless communications base transceiver station (BTS) and the time standard of the Global Positioning System (GPS). The technology of the present invention enhances the performance of WLS services employing assisted-GPS (AGPS) operations, which are extended through or adjunct to the communications facilities. Additionally the performance and efficiency of a GSM-supporting infrastructure-based WLS is similarly enhanced with the present invention in enabling the precise time-synchronized collection of (e.g., frequency-hopped) signals at a multiplicity of remote LMU locations that may be too distant from the serving BTS of interest to be able to detect the serving BTS's frame boundaries. Examples of general augmentation services that benefit from the accurately derived BTS signal synchronization include any that can exploit precise information describing the relative timing relations among the BTS communications signals independently transmitted by the WCS BTSs. Such services may include resource and message management and control within the WCS itself, as well as WLS services.

According to one aspect of an illustrative embodiment of the present invention, a method for determining a GPS-synchronized timing representation for downlink signals transmitted from a BTS comprises the steps of receiving, at a measurement unit, a downlink signal transmitted by the BTS; evaluating the downlink signal to determine a time of arrival (TOA) at the measurement unit of a specified portion of the downlink signal; and determining an optimal time value for a GPS-based transmission time of an identifiable instant related to the measured TOA. The step of receiving the downlink signal may comprise receiving the downlink signal at a network of measurement units. The method may also include communicating the optimal value to the WCS, and/or communicating the optimal value to a mobile station (MS) served by the WCS. The method may be performed to support an augmenting service (such as wireless location) associated with the WCS serving a wireless MS, and may also include the step of communicating the optimal value to the augmenting service. In the illustrative embodiment, the identifiable instant may comprise a communications data frame boundary and/or the specified portion of the downlink signal may comprise a communications data frame boundary.

According to another aspect of the present invention, a computer readable medium (disk, memory, signal carrier, etc.) comprises instructions for instructing a processor to perform a set of steps to determine a GPS-synchronized timing representation for downlink signals transmitted from a base transceiver station (BTS) of a wireless communications system (WCS). The set of steps may comprise the steps summarized in the paragraph immediately preceding this paragraph.

According to yet another aspect of the present invention, a wireless system comprises a location measuring unit (LMU) and at least one base transceiver station (BTS) for communicating with at least one mobile station (MS), the LMU including a GPS receiver and a receiver for receiving downlink signals transmitted by the BTS, and a processor programmed to perform a set of steps to determine a GPS-synchronized timing representation for downlink signals transmitted from the BTS. Here again, the set of steps may comprise those steps summarized above.

According to yet another aspect of the invention described herein, a method and system for signal processing are provided. In an illustrative embodiment, the method and system include the following steps, or means for performing the following steps: (a) acquiring a candidate time series from a received BTS downlink burst signal; (b) correlating a frequency correction channel (FCCH) replica with a candidate broadcast control channel (BCCH) beacon signal to determine a nominal frame time alignment and time of arrival (TOA) for the FCCH burst signal; (c) correlating a synchronization channel (SCH) extended training sequence to determine a time alignment and TOA for an SCH burst signal; and (d) attempting to demodulate the SCH burst signal.

A further embodiment of this signal processing method/system may include: (e) determining whether the SCH demodulation is acceptable and if so, applying selected base station identity code (BSIC) and frame number/reduced frame number (FN/RFN) to form a complete SCH replica; correlating the SCH replica with the candidate BCCH signal to refine the TOA measurement for the SCH burst signal; and integrating the SCH correlation with the associated FCCH correlation for the refined measurement of TOA.

In yet a further embodiment, the process may include, as part of step (e), determining whether the correlation results are acceptable and if so propagating the measured GPS time-based TOA to an appropriate frame boundary, and forming a record of correlated BCCH carrier identification, BSIC, FN, and GPS-based TOA.

In yet a further embodiment, the process may include: (f) determining whether the SCH demodulation is acceptable and if not, obtaining A-bis monitoring system (AMS)-derived possible partial/modulo frame and associated BSIC information for the candidate BCCH signal; calibrating the AMS-derived timings to GPS-based times for possible partial/modulo frames, and using the candidate AMS-derived partial/modulo frame information to form the possible complete FNs with associated RFNs for the SCH; applying selected BSIC and FN/RFN to form a complete SCH replica; correlating the SCH replica with a candidate BCCH signal to refine the TOA measurement for the SCH burst signal; integrating the SCH correlation with an associated FCCH correlation for a refined measurement of TOA.

B. Detailed Description of BTS-to-GPS Signal Synchronization, Determination and Use FIG. 1 depicts the components representative of a standard wireless communications system (WCS) 100. Although the technology represented in FIG. 1 is expressed with some of the terminology typical of a Global System for Mobile Communications (GSM) infrastructure, the technology is also comparably applicable to and beneficial for implementations of cellular wireless communications in accord with other standards, such as the Third Generation Partnership Project (3GPP) technical specifications (TSs) describing the Universal Mobile Telecommunications Service (UMTS). In FIG. 1, the wireless mobile communications unit or mobile station (MS) 101 communicates via a radio frequency (RF) link carrying transmissions to and from a base transceiver station (BTS) 102. As highlighted in the dashed circle in FIG. 1, the BTS facilities include the uplink-receive (U_Rx) and downlink-transmit (D_Tx) antenna(s) and associated cables for the appropriate signals carrying the wireless communications. A set of (typically three) BTS cell sectors (or sectorized cellular areas of operation) cover a localized communications area or cell (surrounding a serving BTS) served by the antenna(s) deployed at the BTS terminal location. Each cell sector is identified by its unique cell global identifier (CGI, which term is also used herein to refer to the BTS cell facilities). Each BTS may individually or independently generate its time base or time-standard/reference for its transmitted downlink signals based upon an independent oscillator that operates at a nominal time base frequency, within specification tolerances. For GSM service, a compliant standard BTS timebase reference is specified to operate at 13 MHz, within a tolerance of 0.05 ppm or 0.65 Hz. A set of the various BTSs covering a broader operational region are controlled by a base station controller (BSC) 103. The BSC manages the MSs and BTSs operating within its domain, and this management includes the handover (HO) of the responsibility for the integrity of the RF link with a particular MS from one BTS to another, as the MS moves from the cellular coverage of the cells of one BTS to those of the other BTS. In a similar manner at a lower level of communications management, the BSC also manages the HO of an MS from one BTS sector to another and the BTS detects the successful execution of the HOs within its domain. At a higher level of management, a mobile switching center (MSC) 104 manages a multiplicity of BSCs, including the management of the HO from one BSC to another for the communications with a MS. In supporting the WCS operations, any MS operating under the control of its particular serving CGI (SCGI) is required to synchronize itself to the SCGI's transmitted BTS downlink "beacon" signal, and thus the signals from the distinct BTSs are not required to be synchronized to a common time standard, such as the GPS time base.

The shared use and management of the full communications spectrum allocated to a particular WCS carrier is exercised through the time, frequency, and spatial separation or isolation of signals transmitted approximately simultaneously. While commanding enough signal power to support service through the single appropriate spatially separated BTS, the WCS suppresses or minimizes the transmitted power levels of the MSs so that their transmitted signals are "contained within" their assigned cells/sectors as much as possible and do not excessively "leak into" and/or interfere with the communications in other cells/sectors. Frequency separation is employed at the highest level in the application of distinct frequency bands for the "downlink" transmissions from the BTSs to the MSs and for the "uplink" transmissions from the MSs to the BTSs. E.g., the uplink and downlink frequency bands for "GSM 850" (NA cellular) operation are 824-849 MHz and 869-894 MHz respectively, and those for "PCS 1900" operation are 1850-1910 MHz and 1930-1990 MHz respectively. Further, frequency separation or frequency-division multiple access (FDMA) within each such full spectrum band allocated to a WCS occurs with the separation of the downlink and uplink bands into a set of coordinated uplink-downlink-paired "frequency channels" or "sub-bands," which are characterized by a narrower bandwidth that is only a small part of the full WCS spectrum bandwidth. E.g., the GSM frequency channel "bandwidth" and adjacent-center separation is 200 kHz. For the communications between a BTS and a particular MS, the WCS assigns a coordinated downlink/uplink channel pair. These frequency-separated communications channels are designated by an absolute radio frequency channel number (ARFCN). With such FDMA applied in association with the time-burst separation described below, the MS and BTS transmissions are allocated among separate frequency channels such that distinctly directed transmissions in a common frequency channel at a common burst time (i.e., in a common "time slot") should typically occur only in distinct serving cells with operational areas separated by sufficient spatial distance to reduce co-channel interference to an acceptably low level.

For the additional temporal isolation, the multi-user communications service is facilitated through the synchronization of the served MSs 101 to the time base of the serving cellular BTS 102. In particular, the temporal sequence of signal transmissions is organized into successive "frames" of communicated data or information bits. For the time division multiple access (TDMA) communications employed for GSM operations, each signal frame is further temporally separated into into eight successive "timeslots." GSM (and commonly-coded UMTS) transmissions exploit the interference-mitigation benefits of TDMA, whereby the MS and serving BTS transmissions are inter-synchronized such that distinctly directed transmissions occupying a common frequency sub-band or channel under the common serving BTS are scheduled to occur in distinct timeslots for each distinct MS. For normal communications systems purposes, the standard strategy applied in the control of the MS's transmitted signal timing involves the dynamic adjustment of the MS timing in accord with a timing advance (TA) parameter so that it will be set to the value that will support BTS reception of its transmitted communications in proper time-alignment with the signal frames and timeslots of the immediately serving cell site/sector, i.e., the serving BTS or sector of "serving cell global identity" (serving CGI or SCGI). This WCS strategy serves the purpose and need for coordinating the MS transmissions with the time base of the SCGI, while not requiring any common synchronization between the time bases of the SCGI and any other neighboring cell sites/CGIs.

In the combined exploitation of both FDMA and TDMA for simultaneous multi-user service, the WCS may additionally employ frequency hopping. Under frequency-hopping operations, the WCS assigns and uses distinct (optionally pseudo-random) frequency-hopping sequences that specify distinct frequency sequences in which the frequency channel for each served MS is uniquely changed for each successive frame in a WCS-selected sequence. The self-synchronization of the MS to the time base of its serving BTS adequately supports the cooperative operations of the MS and its SCGI during the frequency-hopping sequence. This rapid frequency hopping supports enhanced interference mitigation by enabling error-correction coding to correct received communications whose demodulations may be corrupted by rare co-channel interference during an occasional short-duration timeslot interval.

While automated MS signal synchronization with the independent time base of the serving cell sector may be adequate for the WCS, considered in and of itself, the performance of other required, requested, or otherwise beneficial services associated with the communications system facilities can be degraded or precluded by this independent BTS time base strategy. For example, such strategy may inhibit the performance of a location service, such as one by which the location of the standard MS/UE is determined based upon measurements of its signal characteristics received by location measurement units (LMUs) at multiple geographically distributed sites. Such degradation of the location service can be life-threatening when it occurs in conjunction with an emergency communication to public safety services. The technology of the present invention enables and exploits the derivation of precise BTS synchronization data in an infrastructure-based WLS to achieve the time-critical collection of MS/UE uplink signals, especially frequency hopped signals, at distantly remote LMU sites at which the serving BTS frame timing could not otherwise be observed. Perhaps most significantly, the technology of the present invention supports optimal assisted GPS (AGPS) service to enable the MS/UE's efficient and robust measurements of location-related GPS signal characteristics by exploiting and providing to the MS/UE the representative data that describes the current BTS-to-GPS signal synchronization for the relevant SCGI. The MS/UE can use the synchronization data and the supporting BTS downlink transmissions to establish the precise GPS relation of its own internal time base standard. With such GPS-based time base relations, the MS/UE is enabled thereby to exploit the other assistance data supplied by the AGPS server in anticipating the optimal settings for the control of the MS/UE's internal GPS signal processing. These assistance-based GPS signal processing settings enhance the efficiency, timeliness, robustness, and accuracy of the MS/UE-derived GPS measurements.

As presented in FIG. 2, a location-determination system that cooperates as an adjunct to a wireless communications system may be termed a Serving Mobile Location Center (SMLC) 200. An infrastructure-based, or "overlay," wireless location system or SMLC can be represented with the overlay configuration of components depicted in FIG. 2. In FIG. 2, the RF uplink signals in the communications channel from the MS/UE 101 of interest are received and measured by LMUs 202 that are deployed at locations distributed throughout the operational domain of the communications system. [Note regarding terminology: In 3GPP GSM terminology and in this description, the term "SMLC" refers to the entire location determination system, also called the "WLS" herein, whereas in other contexts "SMLC" refers to the sub-system component that is called the "WLP" in this description. As also used herein, the 3GPP term "LMU" refers to the geographically dispersed SMLC/WLS component that receives transmitted RF signals and measures (e.g., location-related) signal characteristics, whereas such a component may be called the signal collection system "SCS" in other contexts or descriptions of the background art] Typically, as may be visualized with the "overlay" of FIG. 2 on top of FIG. 1, LMUs 202 are deployed at BTS 102 facilities, and thus the LMU usually accesses or "taps" its uplink-receive (U_Rx) signals for the location-related measurements via multi-coupling to the same signal feeds that the BTS uses from the antenna(s) deployed for the communications. For time base synchronization of the (location-related) data collections and measurements at the distributed LMU sites, the LMU accesses GPS signals via a GPS-receive (GPS_Rx) antenna with cable, as highlighted in the dashed circle in FIG. 2. Additionally, as highlighted therein for the enhanced facilities of the present invention, the LMU senses the BTS downlink transmissions via a downlink-receive (D_Rx) antenna with cable. As depicted in FIG. 2, although the LMUs are typically but not necessarily deployed at BTS sites, they are also not necessarily deployed one-for-one with the BTSs. The measurements of the received signal characteristics extracted by multiple LMUs are managed and collected through wireless location processors (WLPs) 203, each of which directs the operations of multiple LMUs. The WLP oversees the selection of the particular LMUs that are tasked with providing the measurements for a particular MS of interest. Upon reception of the appropriately measured signal data, perhaps including through other WLPs managing LMUs not under its direct control, the WLP will typically also evaluate the data and determine the optimal (location) estimate based upon the data. Typically, a WLP may manage the operations of LMUs covering a geographic region for which the corresponding communications services are provided by multiple BSCs. The wireless location gateway (WLG) 204 of the SMLC conducts overall control and tasking of the WLPs. The WLG is typically (but not necessarily) co-located with a MSC 104 (and may interface with it). The WLG interfaces with and exchanges location-related requests, information, or data with the multiple BSCs it serves within the communications system. The WLG validates the location-service requests, and disperses the location-determination results to authorized recipients.

In order to support the successful operation of services such as location determination and enhanced communications management, the technology of the present invention provides the mechanism through which data describing the synchronization or alignment of the time base for each geographically distributed BTS to the single worldwide GPS time base is determined and provided. In an exemplary embodiment, this synchronized time base information from a network of multiple measuring units (LMUs) for the WCS BTSs derives from the adaptation and application of WLS facilities. Exemplary embodiments for the present invention are presented in the following descriptions.

LMU Measurements

As represented for the embodiment in FIG. 3, the inventive BTS-to-GPS synchronization determination is achieved for any particular BTS through correlated processing and analysis of locally received GPS signals and of the BTS's downlink signals that are received and precisely GPS-time tagged by at least one LMU. FIG. 3 provides an exemplary illustration of the adaptation and use of facilities that are commonly available in a SMLC/WLS LMU for the purpose of achieving precisely synchronized signal data collection, processing, and time tagging/labeling, to support location determination. For the example adapted LMU embodiment represented in FIG. 3, the RF signals of interest are received via a GPS antenna with cable 301 and a downlink antenna with cable 302. These two RF signal antenna assemblies may be physically separate, as shown, or they may be structurally combined and share a common received-signal cable for connection to the LMU wherein the combined signal may be split and filtered for the distinct GPS and downlink functions. Additionally, for the ongoing WLS service, the normal uplink RF signals are received via an uplink antenna with cable 303. Descriptions of normal LMU/SCS components for a WLS embodiment are available in the U.S. patent descriptions of the background art assigned to TruePosition, Inc., the assignee of the present invention, examples of which art are identified in a list below. In particular, such descriptions of RF signal acquisition facilities for a WLS augmenting a WCS include those of U.S. Pat. No. 6,351,235, Method and System for Synchronizing Receivers of a Wireless Location System ("the '235 patent"); U.S. Pat. No. 6,388,618, Signal Collection System for a Wireless Location System; U.S. Pat. No. 5,327,144, Cellular Telephone Location System; and U.S. Pat. No. 4,728,959, Direction Finding Localization System. Throughout all of this background art, the uplink signal conditioning, acquisition, collection, and processing components and facilities appropriate for an effective WLS LMU are extensively described.

As represented in the background art, acquisition of the WCS RF signals of interest begins with conversion 304-305 of the frequency content of the analog signal from the transmitted WCS bands to a filtered and frequency-shifted form at a low enough center frequency to support cost-effective and accurate analog-to-digital conversion. Typical components for the frequency conversion are represented in FIG. 4. As appropriate for optimal performance of the following signal conditioning components, the input/sensed signal 401 may be bandpass filtered (BPF) 402 to restrict the signal to those frequencies predominantly contained in the band of interest. The subject band of interest may separately be the uplink band for the WLS determination or the downlink band for the time base representation objectives of the present invention. The input signal may also be isolated and amplified 403, preferably through a low-noise amplifier (LNA), to achieve the design performance and mitigate the system noise impacts of the subsequent signal-conditioning components. The resultant signal then enters a mixer 404 for effective multiplication by a signal supplied by a local oscillator (LO) generator 405. The LO generator provides the single-frequency (tone) signal that, when mixed with the input signal, results in the desired difference-frequency signal equivalent to the received RF signal waveform. For optimal accuracy in maintaining the integrity of the LO frequency and avoiding temperature-induced frequency drifts, the generation of the LO may be phase locked to an input reference time base (oscillator) signal 406. The mixing 404 of the stabilized LO signal 407 with the conditioned input signal results in a composite signal that includes both unwanted sum-frequency and desired difference-frequency components. The subsequent bandpass or lowpass filtering 408 rejects/attenuates the unwanted components and produces the desired intermediate-frequency (IF) or baseband (zero-frequency centered) signal 409, which is the frequency-shifted analog equivalent of the sensed RF signal of interest. In some embodiments, the desired frequency conversion with optimal signal integrity may be achieved through an "IF strip" of successive frequency conversion stages employing a sequence of LO frequencies, which ultimately results in the desired output-signal center frequency. For optimal exploitation of WLS uplink signal processing facilities in the LMU embodiment adapted for the present invention, the output IF/baseband frequency content for the signal from the downlink conversion is designed with the application of filtering, mixing and LO frequencies to span the same frequency domain entering the analog-to-digital conversion as that for the uplink frequency conversion.

In a manner similar to the uplink conversion 304 for the WLS, the adapted LMU represented in FIG. 3 applies downlink frequency conversion 305 for the present invention. For the acquisition of the downlink frequency band or any (sub-) channel in that band, this frequency conversion occurs with the signal filtering/amplification 402/403 and the generation 405 of a frequency-shifting LO signal 407 that are particular and appropriate for the frequency content of the downlink band. As described in the '235 patent, the exemplary embodiment of the LMU applies a stabilized GPS receiver 306 to produce the GPS-derived time base signals 307, which are distributed to all of the LMU components (including the LO generators) for use as a highly stable time base reference. The band-shifted signal forms 308 resulting from the frequency conversion are input to the analog-to-digital converter (ADC) 309. Most significantly for the present invention and as similarly described in the '235 patent, the ADC samples the input signals 308 at "strobed"/pulsed instants that are precisely phase locked to the GPS reference time base 307. Thus the resultant digital downlink-signal samples 310 are precisely time referenced in synchronization with the worldwide GPS time base. Since each LMU in the network of LMUs distributed throughout the operational domain of the WCS is individually synchronized to the single common GPS time base, the GPS-timing for each of the separately clocked BTS downlink signals can be related to the common GPS time base through reception and evaluation by the LMUs in the vicinity of any subject BTS. This GPS-time synchronization for the acquired signal samples supports the associated GPS-time labeling in the processing 311 of the digital signals, which processing produces the desired synchronization representation 312 output from the LMU.

The self-generated time base for the BTS (downlink) transmissions is "clocked" or "driven" by the BTS's independent oscillator, which is required to operate at 13 MHz within a tolerance of 0.05 ppm (i.e., 0.65 Hz) but is otherwise not required to be synchronized with any other BTS time base. In some measurements of actual operating GSM BTSs, TruePosition, Inc., has observed ongoing/persistent deviations from the nominal reference frequency by a factor greater than twice the required tolerance.

The processing 311 of the present invention that supports derivation of the GPS-synchronization representation for the WCS BTS downlink signals is designed to characterize the GPS-based time characteristics of a selected instant of the BTs signals. In the conduct of routine WCS services, the serving BTS transmits a RF signal that is modulated to communicate control/access or voice/traffic bits that are organized in successive "frames" of data. Although any periodically detectable and identifiable instant in the bit sequence from the BTS downlink transmissions would suffice, a frame boundary is selected in an example embodiment to be the representative instant for the time tagging in synchronization with the LMU-determined GPS time base. Thus, in an exemplary embodiment, the present invention characterizes the BTS-to-GPS synchronization for the independently timed BTS frame boundaries.

For the example of a GSM WCS as described in the 3GPP TSs, the transmitted frames are normally organized as represented in the sequence shown in FIG. 5. At the highest level for normal transmissions, a hyperframe 501 comprises a sequence of 2048 superframes, and a superframe 502 comprises a sequence of 1326 (=26×51) frames. The frame number (FN) begins anew at zero (0) for each hyperframe, and increments by 1 until it reaches 2,715,647 (=2048×26×51−1) at the hyperframe ending. Each frame 503 comprises a sequence of 8 timeslots. In equi-slot form, each timeslot 504 has a duration of 156.25 symbol intervals; in alternative form, timeslots 0 and 4 have a duration of 157 symbol intervals, and the other slots have a duration of 156 symbol intervals. In either form, the frame duration is 1250 symbol intervals. The duration of the symbol interval 505 is 48/13(=~3.7) microseconds (usec), and thus the frame duration is 60/13(=~4.6) milliseconds (msec). As represented for the timeslot 504 in FIG. 5, the slot's "active part," during which information/data bits are communicated, is 148 symbol intervals, and the "useful part" is the 147-symbol duration from half way through symbol 0 to half way through symbol 147, since the MS's and (optionally between adjacent used timeslots) the BTS's transmission power is ramped up and down through the beginning and ending symbol of each slot and the phase of the signal is undefined outside of the useful part. Under normal operation, one information/data bit is communicated with each symbol interval 505 through use of the form of signal modulation called Gaussian minimum shift keying (GMSK), which is a ("Gaussian") filtered/smoothed form of differential binary phase shift keying (DBPSK) with a maximal phase change of ±π/2 over a symbol interval. The sequential frames are considered as grouped into a set of 51 successive frames called a 51-multiframe, or are otherwise considered as grouped into a set of 26 successive frames called a 26-multiframe. Thus the superframe may be considered as formed from a sequence of 26 successive 51-multiframes, each with a duration of ~0.235 seconds (seq). Since the GPS-timing characterization of the BTS downlink signals may be selected to apply to any arbitrary identifiable instant such as a frame boundary, it can be selected in the exemplary embodiment of the present invention to apply to a 51-multiframe boundary.

General MS/UE access to the GSM WCS operations is managed through downlink transmissions that usefully repeat for each 51-multiframe of each BTS/CGI. Periodically the BTS downlink transmissions on the carrier frequency ("C0") of its broadcast control channel (BCCH) include timeslot bursts that facilitate the ability of any MS/UE to detect and synchronize itself to the BTS signals. In particular for normal BTS operations, at approximately each tenth sequential frame, the BTS transmits a "frequency correction channel" (FCCH) burst and follows that in the next frame with a "synchronization channel" (SCH) burst, both of which are efficacious for an exemplary embodiment of the presently inventive GPS synchronization determinations relating to the BTS time base. The BTS's FCCH burst occurs in timeslot number (TN) 0 (zero) for each ~10th frame within each 51-multiframe, beginning with the initial frame; i.e., the FCCH burst occurs for relative frame numbers 0, 10, 20, 30, and 40 within each 51-multiframe. The BTS's SCH burst occurs in TN 0 of the following frames; i.e., the SCH burst occurs for relative frame numbers 1, 11, 21, 31, and 41 within the 51-multiframe. Thus, under these operations, the inter-frame spacings for the onsets of this "beacon" pair of bursts comprise four inter-frame spacings of ten frames within each 51-multiframe, followed by one inter-frame spacing of twelve frames to the onset of the next 51-multiframe. These periodic (downlink) FCCH and SCH bursts from each BTS enable the MS/UE to rapidly detect, identify, and determine the BTS-based frame numbering and timing for its appropriate serving BTS. Such reliable and repetitive downlink transmissions from each BTS provide an optimal signal sequence in the technology of the present invention for the determination of the relationship of each WCS BTS time base to the GPS time base.

In the exemplary embodiment, the utility of the FCCH and SCH bursts for the GPS-based timing measurements is particularly enhanced by the a priori known structure of such downlink transmissions. As described in the 3GPP TSs, the transmitted 148-bit sequence for the normal FCCH burst is formed with a sequential bit pattern consisting of:

3 tail bits, with (B0, B13, B2)=(0, 0, 0);
142 fixed bits, with (B3, B4, . . . , B144)=(0, 0, . . . , 0), i.e., all zeros; and
3 tail bits, with (B145, B146, B147)=(0, 0, 0);

where Bn is the bit numbered "n." The 3GPP-described transmitted bit sequence for the formation of the SCH burst consists of:

3 tail bits, with (B0, B13, B2)=(0, 0, 0);
39 encoded bits;
64 extended training sequence bits, with (B42, B43, . . . , B105)=a 3GPP-specified sequence that is the same for all normal SCH transmissions;
39 encoded bits; and
3 tail bits, with (B145, B146, B147)=(0, 0, 0);

where the two sets of 39 encoded bits derive from the rate ½ convolutional encoding of a 39-bit sequence consisting of:

6 base station identity code (BSIC) bits identifying the usage of the subject BCCH carrier in the local operational area: formed from the 3-bit PLMN network color code (NCC) and a 3-bit base station color code (BCC);
19 bits representing the reduced TDMA frame number (RFN): formed with the 11-bit hyperframe number "T1", with T1=FN div 1326; followed by the 5-bit frame index "T2" within the 26-multiframe, with T2=FN mod 26; followed by a 3-bit reduced frame index representation "T3'" of the modulo 51 frame number (T3=FN mod 51) within the 51-multiframe, with T3'=(FN mod 51-1) div 10;
10 parity bits; and
4 tail bits of zeros (0, 0, 0, 0).

The three-parameter representation (11-bit T1, 5-bit T2, 6-bit T3) fully represents any complete frame number FN (which can span 22 bits for values up to 2,715,647) through the relation $$FN = T1 \times 1326 + ((T3-T2) \bmod 26) \times 51 + T3 \quad (1)$$

where T1 is the full (0, . . . , 2047) hyperframe index, T2 is the full (0, . . . , 25) 26-multiframe index, and T3 is the full (0, . . . , 50) 51-multiframe index. The 19-bit RFN fully represents the SCH FN, since the five allowed values for the SCH T3 parameter are represented with the 3-bit T3' value. For a derived GPS-based time representation that is propagated from a measured time to the nearest or next 51-multiframe boundary in the example embodiment, the associated FN parameter T3(=FN mod 51) has value zero for that beginning boundary to the starting frame. Incorporating these bit sequences, the a priori known forms of the BTS's FCCH and SCH bursts facilitate the effective application of adapted WLS signal correlation techniques for the extraction of TOA information in the digital processing 311 of the sampled downlink signals. In particular, the known signal waveforms modulated from these bit patterns can be applied as the "matched replicas" against which the downlink signals are correlated for the derivation of the downlink signal arrival times.

The digital signal processing 311 of the exemplary embodiment for the present invention is adapted from similar processing techniques described in the background art for the implementation of WLS facilities. The background art describes digital (complex) heterodyning, filtering, and matched-replica signal correlation processing technologies for the WLS digital uplink signal conditioning and correlation, to extract GPS-synchronized TOA (and/or TDOA, AOA, etc.) measurements in the U.S. patents assigned to TruePosition, Inc, the assignee for the present invention. Such background art includes U.S. Pat. No. 6,047,192, Robust Efficient Localization System, and U.S. Pat. No. 6,285,321, Station Based Processing Method for a Wireless Location System. Through adaptation of such techniques to process the downlink frequency band and use the downlink signal waveforms, the present invention efficiently applies similar processing techniques in deriving the desired representation of the downlink time base relative to the GPS time base.

Figure 6:
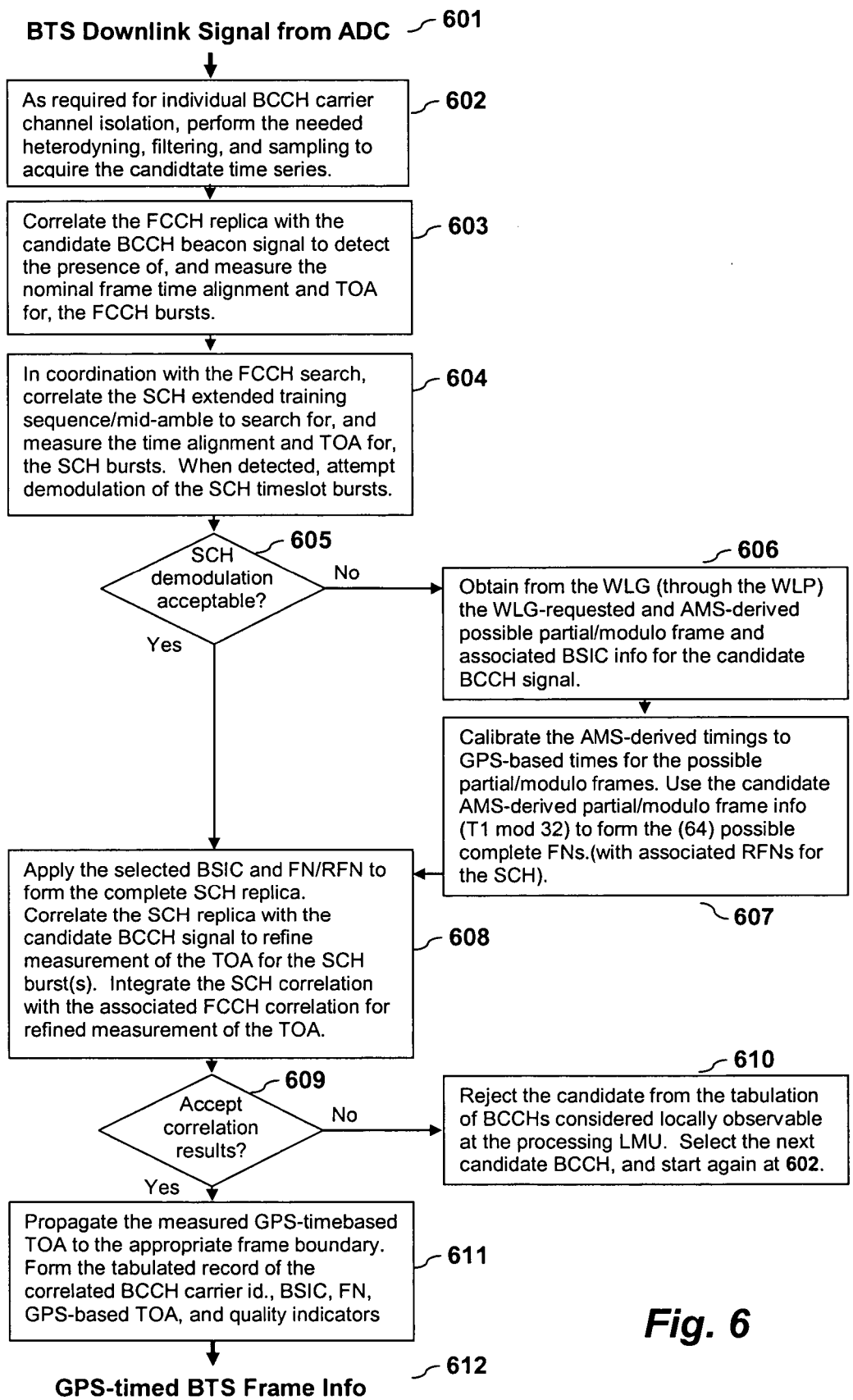
FIG. 6 presents an exemplary embodiment of the major functional components in the inventive BTS digital signal collection, conditioning, and evaluation for the determination of the common GPS synchronization for the network of BTSs.

FIG. 6 depicts illustrative major functions for the evaluations involved in the digital signal processing 311. For the initial signal conditioning of the digitized downlink signal 601, the first stage 602 of this processing includes heterodyning and (bandpass or lowpass) filtering to acquire the downlink digital signal time series, $\{z_n(t)\}$, that captures the frequency-translated baseband form of the sensed RF signal from downlink BTS number "n." As is described in the cited background art and is routine in the acquisition of digitally sampled signals, the analog-to-digital conversion (ADC) 309 produces signal sequences or time series 601 that are sampled at a time base-controlled sampling rate and are time tagged/labeled at a beginning (and optionally a periodically updated) sample instant. The time base 307 applied in the present invention is synchronized and tagged in unison with the GPS-driven oscillator derived from the LMU's GPS-signal reception. The precise time tag for each acquired signal sample 601 is maintained and propagated through any post-ADC digital signal conditioning. Thus a GPS-based time tag for each received and acquired digital sample $z_n(t)$ that enters the signal correlation processing can be precisely characterized in the system.

In the following stages, beginning with 602, of the signal processing 311 for the GPS-based downlink TOA determination of the present invention, the complex baseband signal $z_n(\ )$ acquired for $BTS_N$ is correlated with a "reference" or matched replica signal representation $z_0(\ )$. As described in standard literature such as *The Generalized Correlation Method for Estimation of Time Delay*, C. H. Knapp and G. C. Carter, IEEE Trans. Acoust., Speech, Signal Processing, vol. ASSP-24, no. 4, pp. 320-327, August 1976, signal cross-correlation can provide the optimal detection and measurement of a time offset between two signals. As noted above for normal GSM BTS transmissions, the FCCH and/or SCH bursts provide opportune and robust correlation signal forms that are known—fully for the FCCH and partially for the SCH—prior to signal reception or transmission. The generic expression for the complex correlation $\gamma(\tau)$ between two signals can be expressed as:

$$\gamma_{12}(\tau) = \frac{\int_{-T_C/2}^{T_C/2} z_1^*(t) z_2(t+\tau) dt}{\sqrt{\left[\int_{-T_C/2}^{T_C/2} |z_1(t)|^2 dt\right]\left[\int_{-T_C/2}^{T_C/2} |z_2(t+\tau)|^2 dt\right]}} \quad (2)$$

where $z_n(\ )$ represents a complex signal sample, $\tau$ represents a time "lag"/"delay"/offset (e.g., T(D)OA) value between the two correlated signal time series, and the correlation is accumulated over the coherent integration time $T_C$. In such evaluations, under the hypothesis of signal presence with adequate SNR, the candidate signal level is approximately related to the expectation for the correlation magnitude squared through the relation:

$$|\gamma_{12}|^2 = SNR_1 SNR_2/[(1+SNR_1)(1+SNR_2)] \quad (3)$$

where $SNR_n$ represents the signal-to-noise ratio of the power levels for the two signals that are cross-correlated.

An exemplary embodiment of the signal processing 311 of FIG. 3 includes the calculation of a correlation 603, 604, and 608 involving a matched replica signal $z_0(\ )$, formed to represent an a priori known FCCH or SCH burst, and involving the downlink signal $z_n(\ )$, acquired to represent the signal received from $BTS_n$:

$$\gamma_{0n}(\tau) = \frac{\int_{-T_C/2}^{T_C/2} z_0^*(t) z_n(t+\tau) dt}{\sqrt{\left[\int_{-T_C/2}^{T_C/2} |z_0(t)|^2 dt\right]\left[\int_{-T_C/2}^{T_C/2} |z_n(t+\tau)|^2 dt\right]}} \quad (4)$$

In expression (4) when the magnitude of the correlation function is optimally maximized, the associated value of $\tau$ represents the desired GPS-based TOA relative to the arbitrarily selected GPS-time tagged instant, $t_0$, at which the integration variable "t" is nominally assigned the value 0 (zero). With the $z_0(\ )$ sample set representing a matched replica having an essentially infinite SNR, the above expectation for the magnitude squared correlation at the optimal correlated alignment can be assessed for the "$SNR_n$" value of the other (finite) ratio:

$$|\gamma_{0n}|^2 = SNR_n/(1+SNR_n) \quad (5)$$

Alternatively, a related and similar relationship between the phase noise observed in the FCCH signal sample set and the associated $SNR_n$ can be assessed for a representative $SNR_n$ evaluation.

When a candidate BTS signal power level is judged to provide an acceptable measurement, its derived parametric accuracy for the TOA value $\tau$ can also be evaluated based upon the signal-strength dependency of the accuracy. For example, expressions for optimal accuracies achievable for T(D)OA measurements are available in the above cited work of Knapp and Carter and in Time Delay Estimation Via Cross-Correlation in the Presence of Large Estimation Errors, J. P. Ianiello, IEEE Trans. Acoust., Speech, Signal Processing, vol. ASSP-30, no. 6, pp. 998-1003, December 1982. Such descriptions can be used to represent a standard deviation a (i.e., square root of the variance) for an optimally weighted ("whitened") correlation-derived T(D)OA τas:

$$\sigma_\tau = \frac{\sqrt{3}}{\pi B} \sqrt{\frac{1-|\gamma|^2}{TB|\gamma|^2}} \tag{6}$$

where B is the bandwidth and T is the integration time involved in the signal processing that produces the measurement, and thus TB is the time-bandwidth product representing the number of independent samples integrated for the correlation evaluation. Note that, in this expression, the measurement accuracy is inversely proportional to the square root of the time-bandwidth product multiplied by the received signal SNR. Thus, within time limits applicable for stationary signal conditions, the timing measurement accuracy is enhanced when a longer available correlated signal duration provides an increased time-bandwidth product or number of averaged noise samples. With typical communications bursts formed from pseudo-random, convolutionally encoded, and perhaps encrypted/ciphered, bit sequences, the "interfering" signals (e.g., with the flat spectral content of a digital communications signal) often impact the measurement accuracy in approximately the same manner as "white" (e.g., thermal) noise, and thus need merely to be incorporated appropriately into the "SNR" evaluation.

For the correlation 602 to detect and use the normal FCCH burst, the (complex) replica signal $z_0(\ )$ is formed as a time-gated (i.e., "leading- and trailing-edge ramped") burst of an otherwise pure "tone," with a duration spanning the useful symbols and with an arbitrary "starting" phase $\phi_0$:

$$z_0(t|f) \sim g(t) \cdot \exp[i(2\pi f t + \phi_0)] \tag{7}$$

where $g(t) \sim h_g(t) * \text{rect}(t/T_u)$;

"*" connotes convolution;

rect(x) is 1 for $|x|<\frac{1}{2}$ and is 0 otherwise;

$T_u$ is the "useful" timeslot duration of 147 symbol intervals: $T_u=147 T$; and $$h_g(t) \sim \frac{1}{\sqrt{2\pi}\,\delta_g T} \exp\left[-\frac{1}{2}\left(\frac{t}{\delta_g T}\right)^2\right], \text{ with } \delta_g \sim 0.4417/2$$

with $h_g(t)$ approximating a Gaussian- or Hann-like window of approximate symbol-interval duration T, in similarity to but with ~half the duration of the GMSK-defined phase filter noted as "h(t)" in the 3GPP TS. The properly normalized correlation of expression (4) would essentially constitute a normalized and windowed form of a Fourier transform if considered as a function of the value for the matched replica tone frequency, "f." However, for the normal FCCH burst, the nominal tone phase evolution for the replica is known to complete one 2π cycle per four symbol intervals (i.e., per 4 T), so the nominal replica frequency is 13×125/24 (=67.71) kHz (e.g., displaced above the BCCH carrier when transmitted as a normal RF waveform by the BTS). Thus the FCCH replica is completely defined a priori.

For the correlation 604 and 608 involving a normal SCH burst, the replica signal of the present invention is also formed from the product of the same burst time-gating window, g(t), and an appropriate GMSK evolving phasor, but the phasor signal for the SCH represents the (pseudo-random) bit sequence for the SCH signal described above:

$$z_0(t) \sim g(t) \cdot \exp[i(\phi(t)+\phi_0)] \tag{8}$$

where $\phi(t)$ represents the GMSK phase evolution for the SCH bit sequence. In contrast with the FCCH burst, the SCH burst waveform is not fully known a priori. As described above and in the 3GPP TS, the SCH bit content does include two 3-bit (leading and trailing) "tail" sequences of zeros, but the short (3-bit) length of these sequences renders them inconsequential for a priori usage. The SCH also includes an extended 64-bit (mid-amble) training sequence that is known as defined in the 3GPP TS. Thus this extended mid-amble part of the full 148-bit SCH can be formed into a partial-length a priori known matched replica for the correlation 604 contribution of the SCH to the downlink TOA determinations.

For progression to the full SCH correlation 608, the quality of the SCH signal for demodulation is assessed 605. Under routine downlink signal reception conditions when the downlink received SNR is adequate for the reliable demodulation of the complete transmitted bit sequence in the SCH, then the present invention uses that complete demodulated bit sequence to form 608 the full-timeslot matched replica for the complete SCH burst. As represented in relation (6), when a replica of longer time duration is applied in the correlation evaluation, the resultant accuracy of the derived TOA value is enhanced. As also described above, a fully demodulated SCH also provides the (reduced frame number) RFN representation of the full frame number FN for each SCH burst and includes the BSIC identifying the BTS from which the downlink signal is acquired. With the proper adjustments for signal propagation time and frame boundary offset (as described further below), these demodulated parameters for the detected BCCH carrier are included in the desired tabulation of the BTS identity and transmitted frame number in association with the ultimately derived representation for the GPS-based TOT.

Under different example conditions such as occur when the downlink received SNR may not be adequate for reliable demodulation of the SCH bit sequence, the LMU's downlink correlative signal processing 311 can be augmented through procedures 606-607 in the present invention using supporting information collected by the WLS's WLG and/or WLPs from a system that monitors data links supporting the WCS operations. Such an SNR condition might occur where the nearest or best-situated LMU for a BTS/CGI of interest is nonetheless deployed at a location that is excessively distant from the subject BTS of interest or is environmentally blocked or configured away from strong reception of the BTS's downlink signals. For the conduct of its operations, the WCS of FIG. 1 exchanges information between the MSC 104 and any BSC 103 across a data link using protocols defined in accord with specifications for the so-called "A interface." The WCS of FIG. 1 also exchanges information at the lower level between a BSC 103 and any of its BTSs 102 across a data link using protocols defined in accord with specifications for the so-called "A-bis interface." In background art assigned to TruePosition, Inc., the assignee of the present invention, U.S. Pat. No. 6,728,264, Monitoring of Call Information in a Wireless Location System ("the '264 patent") thoroughly describes an A-bis Monitoring System (AMS) for the enhancement of WLS operations and performance. For application in the present invention, an adapted form of the '264 patent's AMS is directed and applied to provide timing and frame numbering information that assists in and is integrated with the downlink signal processing evaluations 311 of the present invention. In the exemplary embodiment of the present invention, this cooperative application of AMS-derived information is especially efficacious under signal reception conditions that occur when a LMU-received BTS downlink signal is not fully demodulated to support the SCH correlation analysis.

Figure 7:
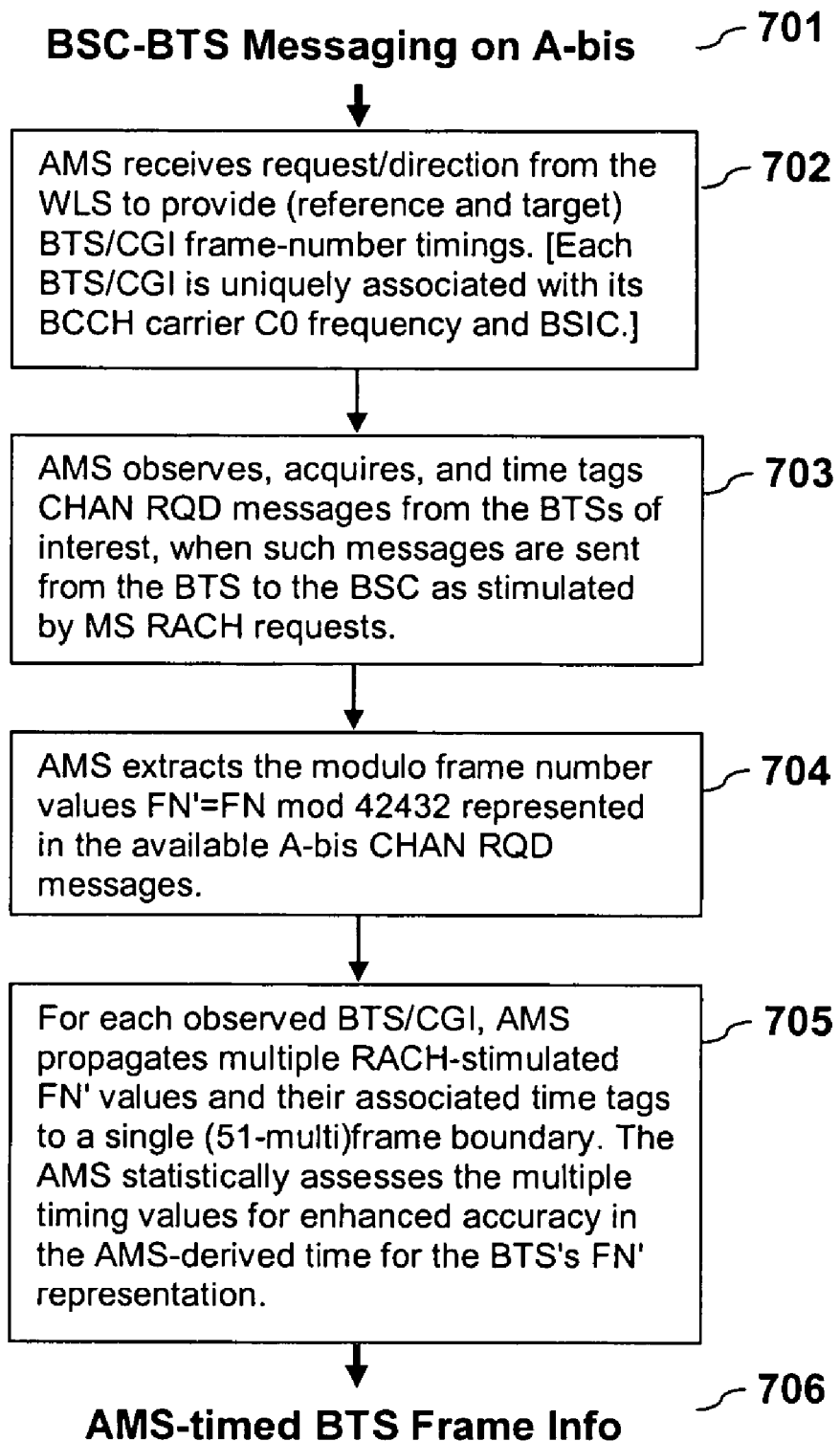
FIG. 7 expands upon the major functional components involved in the inventive application of AMS facilities to support the SCH correlation evaluations shown in FIG. 6.

FIG. 7 expands upon procedures by which the AMS can serve the functions 606 supporting the LMU evaluations. Through access to all of the WCS information exchanged between a BSC and its BTSs on the A-bis interface, the AMS can provide frame number and timing data to assist the LMU in the processing of the present invention that determines and identifies the GPS-based timing for BTS downlink frame boundaries. As described for the background art embodied in the '264 patent, the AMS design enables the acquisition and time tagging of the WCS management support information that is exchanged between a BSC and a BTS. In support of the technology of the present invention, the AMS of the '264 patent is adapted to appropriately characterize the times of occurrence of identified relevant frame events. These timing observations and their associated partial (i.e., "modulo") frame identities available from the AMS are then provided to the WLS for usage in the LMU. Since the AMS processing is independently "clocked" or driven by its internal timing oscillator, the AMS time base can be separately related to the LMU-derived GPS time base through the comparison or inter-relation of frame-related time assignments for reference BTSs that are observed in common by both the LMU and the subject AMS. Then the modulo frame identities for the subject target CGI can be used, with propagation to current or immediately impending time, to create appropriate FN bit sequences for SCH correlation processing, especially under conditions when the FN data are not demodulated directly from the target received BTS/CGI downlink signal.

The initial stage of the adapted AMS assistance for the frame timing determinations involves the AMS capability to acquire frame identity information from the A-bis messaging 701 that supports the ongoing operations of the WCS. As described above for the GSM protocols specified in the 3GPP TSs, a MS/UE monitors and synchronizes itself to its serving BTS/CGI beacon downlink transmissions. When a MS needs access to dedicated communications channel facilities such as to place an emergency (e.g., 911) call or to respond to a paging channel (PCH) burst that it has observed on the downlink common control channel (CCCH), it transmits a random access channel (RACH) burst on the uplink CCCH. The WCS ultimately responds to a MS's RACH request with an immediate assignment (IMMEDIATE ASSIGN) message on the downlink access grant channel (AGCH) to the MS, identifying the dedicated frequency channel resources that the MS is assigned to use along with the frame-specific time (Start Time) at which it should begin such usage. The CCCH, comprising the downlink RACH and the uplink PCH and AGCH, has the same (BCCH) CO carrier as that of the FCCH and SCH downlink beacon bursts, but these call management bursts do not conflict with each other (i.e., the PCH and AGCH downlink bursts do not occur in the same frame-timeslot combinations as do the beacon bursts). In order to support the BSC control of the WCS resources allocated for the communications service to any MS, the relevant information attendant to the service initiation messaging is exchanged between the BSC and the serving BTS through the A-bis link.

For the technology of the present invention, the AMS is adapted to accommodate a request or command 702 from the WLS to acquire and provide an initial characterization of the BTS frame-timing information that the AMS can observe on the A-bis data link. Through connection to the A-bis link, the AMS monitors the messaging exchanged between a BSC and the multiplicity of BTSs that the BSC controls and serves. Whenever a BTS receives an uplink RACH request, the BTS sends to its BSC a corresponding channel required (CHAN RQD) message. The CHAN RQD message includes an identifier for the particular request, and also includes a partial or "modulo" representation of the BTS frame number in which it received the MS request. As requested or directed by the WLS, the AMS may observe and time tag 703 a representative ensemble of such CHAN RQD contents for each of the BTSs that the BSC serves. The Channel Activation Acknowledge message also contains this same modulo representation of the BTS frame number (FN).

The AMS representation 704 of the FN observed in the messaging is "partial" or "modulo" in the sense that it does not express the full 22-bit value for the full FN described above. For content efficiency, the BTS-BSC messaging only uses 16-bits for the FN representation. In similarity to the above three-parameter representation of the FN, the A-bis messaging does use the 6-bit T3=FN mod 51 and the 5-bit T2=FN mod 26, but only uses a 5-bit "T1'" parameter to represent the low-order 5-bit form T1'=T1 mod 32 of the hyperframe index T1. Thus, when reconstructed as represented in relation (1) but using T1', the A-bis and AMS form FN' of the frame number, which is used both for BSC frame numbering and Start Time specification, represents a "modulo" form: FN'=FN mod 42432 since 42432=32×1326=32×26×51.

Upon its observation and time tagging of relevant frame events, the AMS can statistically evaluate 705 the modulo FN' characterizations for use by the WLS in supporting the precise GPS-timebased determination of the present invention. With timing characterizations of multiple independent (RACH) frame events for a common BTS, the independent time values can be propagated to a common frame boundary by addition/subtraction of the appropriate integer multiple of the frame duration (~4.615 msec). For each observed BTS, the statistical assessments of an ensemble of tagged frame events, propagated to a common (51-multi)frame boundary, can include averaging and/or outlier rejection involving the application of order-based statistics such as the median and other cumulative-distribution expectation values. The resultant representation 706 of the AMS-timebased FN' occurrences can then be applied in the LMU's evaluations for the BTS's downlink signal timings that are associated with the CGI's BCCH CO carrier and BSIC.

For the time tagging or characterization of its observed messaging, the AMS applies its own internal clocking or reference time base. Although the AMS time base reference could be GPS-derived, general cost efficiency typically precludes the inclusion of GPS signal reception or time base synchronization internal to an AMS unit. Thus the AMS's time tags of its observed modulo FN' events are further evaluated with the GPS-timebased information that can be derived by the receiving LMU.

Upon receipt of the AMS's frame-timing characterizations for the BTS/CGIs of interest, the WLS LMU 607 can "calibrate" the available information in accord with its own GPS-driven time base and can then apply the resultant representation as an initiating approximation, from which the BTS downlink SCH signal analyses can provide the precise refinement. When the LMU does not demodulate the SCH bursts to obtain the FN identity for the BCCH carrier of a target BTS/CGI, the requested AMS FN' timing information can be evaluated for a single common AMS that has provided its form of such representations from both the target CGI and an additional "reference" CGI that was successfully demodulated and GPS-timed by an LMU. Through comparison of the target and reference propagated (51-multi)frame times observed/measured in common by the subject AMS and any reference LMU, the time base offset for the subject AMS can be calibrated to the LMU's GPS time base. The relevant AMS time base correction, Delta, is the difference between a representative LMU-derived GPS-timebased FN time and the equivalent AMS-derived FN' time. The correction of all observed AMS-based times by the AMS's Delta difference calibrates or registers that AMS's time tags in relationship to the GPS time base.

For optimal accuracy in such adjustments, the relevant time tags are appropriately adjusted, as described below for relations (12) or (13), to account for distance-related signal propagation and equipment group delays. I.e., since the AMS RACH times approximate those "at" the position of the reference and target BTSs while the reference LMU TOAs are at the positions of the downlink receiving LMUs, a reference LMU TOA for the selected and propagated representative FN is first adjusted to produce a reference GPS-timebased TOT ("at" the reference BTS). Then the reference Delta difference with the AMS-based time for the equivalent reference FN' is calculated and applied as the time correction for the AMS-derived and GPS-corrected target CGI FN' and TOT. Finally the opposite polarity distance and group-delay adjustment is applied for the target CGI and LMU to produce the anticipated target FN' and approximate TOA (for the measuring LMU).

As similarly described above, to the extent that multiple such calibration "Deltas" can be determined for the same subject AMS from multiple associated LMU-evaluated reference BTSs, then those multiple values can be statistically processed to derive a refined value for the Delta. The resulting value for the AMS timing correction can then be added to any/all FN'-timing values for that corrected AMS to "GPS-adjust" the modulo FN' time values for the subject CGI(s) of interest. Such values provide the approximations from which refinements from the complete downlink signal evaluations can be formed.

To support the full SCH-based correlation evaluations of the BTS downlink signals, the "modulo" values FN' obtained from the AMS observations can guide the formation of the candidate full FN values. As described above, the modulo FN' value for a subject BTS/CGI and its GPS-calibrated approximate time of occurrence is obtained from AMS-observed messaging that represents the frame number modulo 42432, having a roll-over or repeat cycle or period every 42432 frames or 195.84 sec. In the present invention, this cycle is very much longer than the response or latency times involved in any of the associated and necessary, signal and data, processing procedures. Thus there is no periodic ambiguity in the propagated time values that are associated with the derived impending frame number values, which are or will be applied in the downlink signal correlation evaluations. However, for assistance to the LMU in forming the full matched signal replica for a full SCH TOA measurement, the modulo representation FN' of the candidate frame number is extrapolated to the associated full FN value. This extrapolation 607 is postulated for each of the 64 possible values (0, . . . , 63) for the high-order 6-bit value of FN div 42432, to form the (binary) representation of the full potential hyperframe index T1. The results of the ensuing correlation assessments 608 can then indicate the valid full/complete FN value, while also providing the refinement of the GPS-timebased TOA value for that FN of the subject BTS/CGI.

Finally, the BTS downlink TOA determinations in the signal processing 311 of the present invention are further refined through the additional incoherent integration 608 of successive correlation evaluations. I.e., as described above, the correlation for a candidate "beacon" BCCH carrier is initially evaluated for individual timeslot bursts. Then, for refined measurement resolution or enhanced robustness in the detection of the anticipated BTS "beacon" transmissions, the calculated correlation functions are incoherently integrated or accumulated to provide an enhanced correlation function obtained from an effectively increased time-bandwidth product, through the use of the summed results from individual timeslot intervals. The integration/summation is performed incoherently to accommodate the potential, unknown and arbitrary, inter-correlation phase evolution, since the correlated timeslot bursts occur in one particular timeslot (e.g., TN 0) of the eight timeslots for the different successive frames and since the phase evolution of the transmitted signals is undefined during the guard interval between the end of each useful part of a timeslot burst and the onset of the following timeslot. The incoherent integration of the correlation results can be extended over the five paired adjacent-frame sequences of the FCCH and SCH bursts spaced at 10-frame intervals in each 51-multiframe, and, with proper accommodation of the two additional inter-frame intervals described above, can also be extended over multiple 51-multiframes.

Whenever correlation results from successive (not necessarily adjacent) frames are integrated for enhanced correlation performance, the nominal offset to for the "zero time" in each selected correlation sample set is properly adjusted for appropriate integer multiples of the WCS-specified inter-frame increment in time. Similarly the frame number FN associated with the integrated measurement evaluation is effectively incremented or decremented as appropriate for the sequential position of any contributing frame relative to that of the nominal "zero-point" frame. Thus for 3GPP GSM communications as described above, the inter-frame increment between (the onsets or midpoints of) the paired FCCH and SCH bursts is ~4.615 msec, and between the 10-frame repeats for such pairs in a 51-multiframe is ~46.15 msec. In determining the GPS-timebased tag to associate with a TOA correlation delay derived from an integration of results from multiple frames, the applicable inter-frame time intervals are included in the generation of the accumulated correlation TOA time value.

Upon completion of the correlation analysis 608 using complete SCH replica representations and incorporating the available FCCH correlation evaluations, the quality of the correlation results is assessed 609 for acceptance as indicative of validly observed measurements for a candidate BCCH carrier in the vicinity of the receiving LMU. If the results do not meet acceptable standards, e.g., as judged by SNR and/or estimated TOA measurement accuracy evaluations, then the results are rejected 610, and the search and evaluations concerning the next candidate BCCH carrier for the subject LMU are initiated at 602. When the correlation results provide successful measurements 611 for the observed TOA for a candidate BCCH carrier, the GPS-based (and adjusted as described above, if necessary) TOA referring to its associated frame boundary is inserted into a record incorporating all the desired output information 612, which includes the BCCH carrier, the BSIC, the frame number FN, and associated quality indicators. This record is entered into the tabulation of all of the BCCH carriers that are successfully observed and evaluated for determination of their associated BTS-to-GPS time base synchronization relationships.

WLG/WLP Analyses and Supporting Information

As described in the 3GPP TSs, each WCS BTS (sector) is uniquely identified by its universally assigned Cell Global Identifier (CGI). For management of the communications operations in the general vicinity of each BTS with its allocated BCCH carrier CO frequency, the WCS also maintains and uses a shorter (6-bit) BTS identification that is called the Base Station Identity Code (BSIC). As mentioned above, the BSIC is a combination of a 3-bit PLMN network color code and a 3-bit (local) base station color code. It is the BSIC that is encoded into every SCH transmission from the BTS. The WCS maintains the mapping or association between the BTS-specific CO-associated BSICs and the CGIs. As needed, the WLG may request and also maintain this mapping for its own applications, and will include the CGI in the characteristic tabulation of the BTS-to-GPS time base synchronization representation.

The 3GPP TSs, as reflected in the temporal sequences of FIG. 5, define the nominal time relationship between the detected signal content and the BTS signal frame boundary. Prior to the signal evaluations, the instant of a frame boundary or a timeslot boundary may not be obvious for the candidate received BCCH signal. In the exemplary embodiment of the present invention, the desired TOT information is evaluated (with relations described below) based on the correlation-based measurements of associated TOAs. As expressed in relation (4) and its associated descriptions, the correlation time labels are represented relative to a true GPS time, $t_0$, at which the integration variable has a nominal value of zero. This time "origin" can be selected to be the GPS time of any identified signal sample, and the optimal correlation delay value is added to the parameter for the expression of the observed TOA value in terms of the complete GPS time base. When a quantized form of the correlation delay is initially obtained from the digital signal correlation calculations in terms of a unit-less (not necessarily integer) number of digital signal sample intervals, $n_\tau$, then the delay value in units of GPS-based time is formed from the product of the quantized delay parameter with the inverse of the digital signal sample rate $F_s$:

$$\tau = n_\tau / Fs \qquad (9)$$

Additionally, when it is not convenient or possible to select the origin time to be at a frame boundary until after that boundary is detected and determined from the signal processing, then the desired TOA for the selected frame boundary of interest is obtained by adjustment with 3GPP-specified time intervals to produce the appropriate value for the estimated TOA at the instant of the desired frame boundary. This adjustment to the observed TOA correlation delay value is achieved by addition of the time origin offset value from the frame boundary. An example of such an adjustment would occur with expression (4) when the replica series $z_o( )$ is centered in the middle of the interval spanned by the correlation time $T_C$, as suggested by the symmetric form of the integration limits. In such an implementation, the centered origin may be in the middle of the replica time series, which would place the nominal time origin at the center of the replica mid-amble. For this example, the origin offset from the starting frame boundary is 74 (=148/2) symbol intervals (i.e., ~0.273 msec) on the negative side of the nominally centered time origin. The associated offset adjustment of the TOA measurement registers the value appropriate for the frame boundary relative to the value for the frame center. For further adjustment to a selected 51-multiframe boundary, the appropriate integer number of frame durations (~4.615 msec) is added/subtracted.

In the illustrative embodiment of the present invention, the proper adjustment of the BTS signal synchronization to the GPS time standard also optimally exploits representative data that describe the precise relative positions of the antennas for the transmitting BTSs and the receiving LMUs, as well as the group delay characteristics for the LMU signal collection cables and electronics if appropriate. The BTS transmission positions and the LMU reception positions, as known to the infrastructure-based WLS, enable calculation of the time delays across the relevant signal propagation distances. These delays are appropriately subtracted from the LMU-derived measures of the downlink TOAs to evaluate the equivalent times of signal transmission, TOTs. Additionally, to the extent appropriate for each receiving LMU, the signal-propagation group-delay characteristics of the relevant antenna, cables, and signal conditioning electronics are appropriately removed or subtracted from an evaluated TOA measurement to obtain a value that more accurately represents the BTS-to-GPS frame synchronization at the point of downlink signal transmission.

The relevant antenna location coordinates define the signal propagation distance(s) between a BTS of interest and the appropriately associated measuring LMU(s) in its vicinity. A signal propagation distance is used to adjust the measured TOA, tagged in accord with a GPS-based time standard, for the determination of the associated GPS-based time of transmission for the detected BTS signal content. The positions of WCS MSs and BTSs and of WLS LMUs are represented by three-dimensional coordinates (i.e., latitude, longitude, and altitude), even though available infrastructure-based WLS measurements typically only enable determination of location in the two horizontal dimensions of latitude and longitude. The distance $D_{LMU\_BTS}$ between a LMU and a BTS:

$$D_{LMU\_BTS} = |\underline{x}_{LMU} - \underline{x}_{BTS}| \qquad (10)$$

where $|\Delta \underline{x}|$ represents the magnitude or length of the Cartesian vector difference $\Delta \underline{x}$ between the relevant (RF antenna) positions. The time difference $t_{TR}$ of signal propagation between the times of transmission $t_T$ and reception $t_R$ is related to the distance between positions of transmission and reception, through the relation:

$$t_R - t_T = D_{TR}/c = |\underline{x}_T - \underline{x}_R|/c \qquad (11)$$

where "c" is the speed of RF signal propagation (i.e., the speed of light), and $x_T$ and $x_R$ are the positions of transmission and reception, respectively. When a LMU measures the time of arrival (TOA) for a BTS downlink signal, the derived TOA is directly related to the distance of signal propagation from the associated BTS to the receiving LMU and to the associated time of transmission (TOT) from the subject BTS. Since the desired synchronization representation characterizes the BTS-to-GPS timebase relations for the BTS transmission times (TOTs) of its communications frame boundaries, the measured $TOA_{LMU}$ is adjusted for the above signal propagation interval. The appropriate adjustment can be expressed as:

$$TOT_{BTS} = TOA_{LMU} - D_{LMU\_BTS}/c = TOA_{LMU} - |\underline{x}_{LMU} - \underline{x}_{BTS}|/c \qquad (12)$$

Alternatively, if required for accurate representation of the net cumulative group delay impacts from the LMU's signal reception electronics, cables, or signal relay/transport mechanisms, then the transmission time $TOT_{BTS}$ is not only adjusted for distance-related propagation delay but also similarly adjusted in the present invention with the cumulative group delay parameter for the applicable LMU:

$$TOT_{BTS} = TOA_{LMU} - D_{LMU\_BTS}/c - T_{LMU\_GroupDelay} \quad (13)$$

In contrast with forms suggested by the background art employing uplink signal TOA measurements, the presently inventive distance-related corrections of relations (12) or (13) do not require knowledge or derivation of a MS/UE location for an equivalently precise and accurate correction of the desired TOT values.

The derived GPS-timebased synchronization information can be statistically evaluated to provide a parametric representation of enhanced accuracy. E.g., as similarly described above, when more than one measuring LMU can observe and characterize the GPS-timebased TOT of a representative (51-multi)frame boundary for a subject BTS/CGI of interest, then the results available from the multiplicity of observing LMUs can be averaged or otherwise evaluated with order-based statistical expectations.

Similarly for enhanced accuracy, the GPS-timebased parametric characterization of the BTS time base can be expanded to include the incremental deviation in the time rate of change ("ROT") of the FN-associated TOTs for a subject BTS/CGI. I.e., when FN-associated TOTs for a single BTS are evaluated at times differing by a significant interval (e.g., a half hour), the observed results may indicate that the BTS time base is not producing FNs that are evolving at the nominal 3GPP-specified frame rate of one frame per ~4.615 msec to within 0.05 ppm. When a BTS time base is driven by an oscillator that is persistently displaced from the nominal 13 MHz, then the frame evolution will be in accord with that deviant time base standard. The extent to which the frames evolve at a rate different from the nominal rate may be called the drift rate of time, ROT. As noted in the 3GPP TSs, the ROT can be characterized as a "ppm" factor, and the absolute value of this factor is "specified" to not exceed 0.05, but it has been observed at times to significantly exceed the tolerance limit. Note that a rate deviation equal to the tolerance limit produces a drift in the deviation of the frame boundary by one symbol interval per ~74 sec or in excess of 24 symbol intervals per half hour. Thus the successive measurements of FN-associated TOTs can be simply and accurately characterized both by a first-order temporal drift rate ROT and by the zeroth-order TOT. A standard and simple statistical procedure for such evolution characterization involves the application of so-called "alpha-beta" filtering to the basic FN-TOT measurements. Whenever the GPS-timebased synchronization characterization of the present invention includes such first order (TOT and ROT) parameterization, then the propagation of anticipated FNs and/or TOTs can more accurately project the expected and tabulated values to a desired time or FN of interest.

The processing facilities that are applied for the evaluations of the present inventions are not constrained to the specific units or components in the manner described above. Since the calculations for the signal timings can be accomplished either in LMU facilities/components or in other associated SMLC facilities/components such as the WLP and/or WLG, or can otherwise be shared between the processing resources of all such system components and even WCS and AMS facilities, the collection of the various types of information includes the exchange of data between the various components of the SMLC, the WCS, and/or the AMS.

The BTS-to-GPS timebase synchronization considerations are driven by the objectives for enhanced services performance, particularly the performance of the augmenting location-determination service. Through the use of such time base determinations as described above, the preferred embodiment of the optimal time base evaluation in the present invention enables the benefit in WLS performance that would accrue with the incorporation of the measurements that could potentially be obtained through the precisely timed acquisition and evaluation of signals. Such precisely synchronized signal analysis can efficiently provide reliable WLS measurements, e.g., either from an AGPS-enabled MS that uses the BTS time base in acquiring GPS signals or from an LMU at a distantly remote (BTS) location that cannot otherwise synchronize itself with the serving BTS for the MS of interest.

Evaluation/Exploitation for WLS A GPS Support of GPS Measurements

When the optimal BTS-to-GPS synchronization parameters or representations have been determined and tabulated for the desired beacon transmissions from the BTS of interest, these timing characteristics are provided in a characterization of AGPS Reference Time assistance messages communicated to the using MS. The content of the Reference Time assistance message is described in the 3GPP specification of the AGPS protocols. With the present invention, the tabulation of the GPS-based times for the frame boundaries of the measurable BTS signals include the necessary information associating the BCCH carrier channel identity, the BSIC, the frame number (FN), the GPS-based TOT, the analyzed rate of TOT change (ROT) when observed, and evaluated quality indicators. The Reference Time assistance message is generated by the AGPS Server (e.g., by the SMLC/WLS) in real time when needed to support an AGPS-enabled MS/UE.

For the AGPS Reference Time assistance of the present invention, the GPS-based BTS frame timing information included in the inventive tabulation is temporally propagated to the timely GPS time of week (TOW) value selected by the AGPS Server for encoding into the assistance message. In accord with the 3GPP specifications, the AGPS Server selects the TOW value to be the estimated time at which the MS/UE will actually receive the communicated assistance message. With the Reference Time service supported by the exemplary embodiment of the present invention, a precise and accurate representation of the association between the selected GPS TOW and its respective serving BTS frame, timeslot, and bit numbers are propagated from the nearest tabulated FNs, GPS-based TOTs, and ROTs if available. This temporal propagation of the GPS time-of-frame relationship uses the 3GPPS nominal evolutionary rate of the frames (i.e., 1 frame per ~4.615 msec) when no ROT value has been derived, and otherwise uses the ROT-corrected value for the frame rate when the ROT value has been observed and tabulated.

Upon receipt of the BTS signal-transmission timing representations in such AGPS messages, the MS is enabled to optimally interpret its own internal time base setting, which is synchronized to the time base-driven frame events of the serving BTS. When the proper alignment of the MS time base relative to the GPS time base is known to the MS through the AGPS assistance, the MS is able to accomplish its self processing of its received GPS signals with optimal efficiency and robustness.

Evaluation/Exploitation for WLS Synchronized Uplink Signal Collection

The technologies of the present invention support the effective and accurate operation of the infrastructure of an overlay location system or other wireless services that exploit knowledge of the coordinated time of arrival for the MS signal reception at multiple synchronized sites. With such operation, the MS signal should be received at LMU or similar sites for which the relative time base synchronization information is available. E.g., the number of receiving LMUs is important in achieving the objective accuracy of the location determinations provided by an SMLC, and is critical when stressed near the lower limit needed to obtain any result at all. The location uncertainty covariances representing the accuracy of the estimated location parameters is inversely proportional to the number of effectively applied independent measurements. Thus, since the uncertainty standard deviation or average estimation error is the square root of the corresponding variance, an example WLS accuracy can be two-fold enhanced through inventive management of the time-coordinated signal collections to effect a four-fold increase in the number of cooperating LMU sites contributing effective measurements to the location calculations.

In this manner, the robustness and accuracy of the location determination can be significantly enhanced, particularly under frequency-hopped operations. The applicable signal acquisitions are optimized for precise coordination at LMU sites that may be distantly remote from a serving BTS whose time base could be significantly skewed from that of the GPS. As described above, the strategy for WCS operations of the BTSs does not require or typically invoke co-synchronization of the individual timebases for the BTSs. With the technology of the present invention, the synchronized signal collection is enabled through the specification and coordination of the start and stop times of signal data acquisition in accord with the worldwide common GPS time base, rather than in terms of any locally observable BTS-framing time base. In this manner, the robustness and accuracy of the location determination can be significantly enhanced through optimal signal collection at the sites of all collecting LMUs, through coordinated use of the precise GPS-derived specification of the serving BTS signal time base.

Since the WLS facilities described in the background art do not incorporate technologies for the acquisition and time base evaluation of BTS downlink signals, the present invention provides an optimized evaluation of dynamic measures related to the downlink signal arrival times, adjusted with relevant descriptive static information, in an assessment to achieve multi-site reception timed in association with a commonly synchronized GPS-derived time base.

Citations to Wireless Location System Patents

TruePosition, Inc., the assignee of the present invention, and its wholly owned subsidiary, KSI, Inc., have been inventing in the field of wireless location for many years, and have procured a portfolio of related patents, some of which are cited above. Therefore, the following patents may be consulted for further information and background concerning inventions and improvements in the field of wireless location:

1. U.S. Pat. No. 6,876,859 B2, Apr. 5, 2005, Method for Estimating TDOA and FDOA in a Wireless Location System;
2. U.S. Pat. No. 6,873,290 B2, Mar. 29, 2005, Multiple Pass Location Processor;
3. U.S. Pat. No. 6,782,264 B2, Aug. 24, 2004, Monitoring of Call Information in a Wireless Location System;
4. U.S. Pat. No. 6,771,625 B1, Aug. 3, 2004, Pseudolite-Augmented GPS for Locating Wireless Phones;
5. U.S. Pat. No. 6,765,531 B2, Jul. 20, 2004, System and Method for Interference Cancellation in a Location Calculation, for Use in a Wireless Locations System;
6. U.S. Pat. No. 6,661,379 B2, Dec. 9, 2003, Antenna Selection Method for a Wireless Location System;
7. U.S. Pat. No. 6,646,604 B2, Nov. 11, 2003, Automatic Synchronous Tuning of Narrowband Receivers of a Wireless System for Voice/Traffic Channel Tracking;
8. U.S. Pat. No. 6,603,428 B2, Aug. 5, 2003, Multiple Pass Location Processing;
9. U.S. Pat. No. 6,563,460 B2, May 13, 2003, Collision Recovery in a Wireless Location System;
10. U.S. Pat. No. 6,546,256 B1, Apr. 8, 2003, Robust, Efficient, Location-Related Measurement;
11. U.S. Pat. No. 6,519,465 B2, Feb. 11, 2003, Modified Transmission Method for Improving Accuracy for E-911 Calls;
12. U.S. Pat. No. 6,492,944 B1, Dec. 10, 2002, Internal Calibration Method for a Receiver System of a Wireless Location System;
13. U.S. Pat. No. 6,483,460 B2, Nov. 19, 2002, Baseline Selection Method for Use in a Wireless Location System;
14. U.S. Pat. No. 6,463,290 B1, Oct. 8, 2002, Mobile-Assisted Network Based Techniques for Improving Accuracy of Wireless Location System;
15. U.S. Pat. No. 6,400,320, Jun. 4, 2002, Antenna Selection Method For A Wireless Location System;
16. U.S. Pat. No. 6,388,618, May 14, 2002, Signal Collection on System For A Wireless Location System;
17. U.S. Pat. No. 6,366,241, Apr. 2, 2002, Enhanced Determination Of Position-Dependent Signal Characteristics;
18. U.S. Pat. No. 6,351,235, Feb. 26, 2002, Method And System For Synchronizing Receiver Systems Of A Wireless Location System;
19. U.S. Pat. No. 6,317,081, Nov. 13, 2001, Internal Calibration Method For Receiver System Of A Wireless Location System;
20. U.S. Pat. No. 6,285,321, Sep. 4, 2001, Station Based Processing Method For A Wireless Location System;
21. U.S. Pat. No. 6,334,059, Dec. 25, 2001, Modified Transmission Method For Improving Accuracy For E-911 Calls;
22. U.S. Pat. No. 6,317,604, Nov. 13, 2001, Centralized Database System For A Wireless Location System;
23. U.S. Pat. No. 6,288,676, Sep. 11, 2001, Apparatus And Method For Single Station Communications Localization;
24. U.S. Pat. No. 6,288,675, Sep. 11, 2001, Single Station Communications Localization System;
25. U.S. Pat. No. 6,281,834, Aug. 28, 2001, Calibration For Wireless Location System;
26. U.S. Pat. No. 6,266,013, Jul. 24, 2001, Architecture For A Signal Collection System Of A Wireless Location System;
27. U.S. Pat. No. 6,184,829, Feb. 6, 2001, Calibration For Wireless Location System;
28. U.S. Pat. No. 6,172,644, Jan. 9, 2001, Emergency Location Method For A Wireless Location System;
29. U.S. Pat. No. 6,115,599, Sep. 5, 2000, Directed Retry Method For Use In A Wireless Location System;
30. U.S. Pat. No. 6,097,336, Aug. 1, 2000, Method For Improving The Accuracy Of A Wireless Location System;
31. U.S. Pat. No. 6,091,362, Jul. 18, 2000, Bandwidth Synthesis For Wireless Location System;
32. U.S. Pat. No. 6,047,192, Apr. 4, 2000, Robust, Efficient, Localization System;
33. U.S. Pat. No. 6,108,555, Aug. 22, 2000, Enhanced Time Difference Localization System;
34. U.S. Pat. No. 6,101,178, Aug. 8, 2000, Pseudolite-Augmented GPS For Locating Wireless Telephones;

35. U.S. Pat. No. 6,119,013, Sep. 12, 2000, Enhanced Time-Difference Localization System;
36. U.S. Pat. No. 6,127,975, Oct. 3, 2000, Single Station Communications Localization System;
37. U.S. Pat. No. 5,959,580, Sep. 28, 1999, Communications Localization System;
38. U.S. Pat. No. 5,608,410, Mar. 4, 1997, System For Locating A Source Of Bursty Transmissions;
39. U.S. Pat. No. 5,327,144, Jul. 5, 1994, Cellular Telephone Location System; and
40. U.S. Pat. No. 4,728,959, Mar. 1, 1988, Direction Finding Localization System.

C. CONCLUSION

The present invention's determination and exploitation of the precise GPS-timebased synchronization or temporal coincidence with the independent BTS time base is optimally achieved through the correlative signal processing of the BTS downlink transmissions. In the illustrative and cost-effective embodiments of the present invention, the optimized signal collection/processing and parametric estimation/propagation calculations are executed in the standard SMLC data processing facilities that augment the WCS services. The resultant assessed GPS-referenced time base representation for the BTS transmissions are provided to an augmenting service, such as supports the provision of AGPS operations or the efficiency of WCS operations enhanced through precisely synchronized BTS facilities. When applied in support of a location-determination service, the WCS-to-GPS synchronization data enable the provision of precise and accurate Reference Time assistance to MSs that can exploit the AGPS information, and the synchronization representation can also optimally support the coordinated, efficient and precisely timed MS signal data collection facilities used at remotely deployed LMUs that are cooperating in infrastructure-based WLS operations.

As the basis for the GPS-synchronization evaluations in the exemplary embodiments of the present invention, the correlation processing of the BTS downlink signal and the related analyses described above evaluate and exploit the known signal waveforms and their time intervals or rates of occurrence that are specified in accord with the 3GPP TSs defining the WCS operations. In particular, the time base determination technology of the present invention applies a network of LMU signal collection and analysis facilities to estimate an accurate GPS-based representation of the BTS communications framing time base. As described above, such correlation and analysis processing for the BTS-time base characterization may include: LMU-based GPS-synchronized detection, recognition, and correlated TOA measurement of a priori known BTS downlink signal waveforms, such as those for the beacon transmissions of the FCCH and/or SCH bursts; extraction and association of a complete or full BTS frame number with the measurement-derived time tag; propagation or projection of the directly measured GPS-timebased signal times to the equivalent times associated with selected definitive frame boundaries; assistance from an AMS that provides an intrinsically tagged time for a partial form of an associated modulo frame number, which time is then registered relative to the GPS-time base through comparison with LMU-derived times; adjustment of TOAs to associated TOTs, through correction for distance-related signal propagation delays and perhaps equipment-related group delays; and statistical refinement of a multiplicity or plurality of measurement-based time values for the derivation of a more accurate representative time and/or time-rate deviation.

The principles, embodiments, and modes of operation of the present invention have been set forth in the foregoing specification, from which it should now be readily apparent that a person of ordinary skill in the art may implement appropriate data processing to effect the described technology. The embodiments disclosed herein should be interpreted as illustrating the present invention and not as restricting it. Numerous variations and changes can be made to the foregoing illustrative embodiments without departing from the scope of the present invention as set forth in the appended claims.

Accordingly, the true scope of the present invention is not limited to the presently preferred or illustrative embodiments disclosed herein. For example, the foregoing disclosure of an illustrative embodiment of a BTS-to-GPS synchronization determination system uses explanatory terms, such as Location Measurement Unit (LMU), Serving Mobile Location Center (SMLC), and the like, which should not be construed so as to limit the scope of protection of the following claims, or to otherwise imply that the inventive aspects of the system are limited to the particular methods and apparatus disclosed. Moreover, as will be understood by those skilled in the art, the inventive aspects disclosed herein may be applied in or for the benefit of wireless communication systems that are not based on specific wireless location-determination techniques. For example, the processes by which a wireless communications system determines the optimal time and serving cell identity for a communications handover (HO) can benefit from the relative time base synchronization determinations. Similarly, the invention is not limited to systems employing LMUs and other subsystems constructed as described above. The LMUs, SMLC, etc., are, in essence, programmable data collection and processing devices that could take a variety of forms without departing from the inventive concepts disclosed herein. For example, an LMU may be implemented in the form of a system including a BTS downlink receiver, a GPS receiver, and a programmable computer or processor, and a computer readable storage medium (disk, solid state memory, etc.) for storing computer readable instructions. Given the declining cost of digital signal processing and other processing functions, it is possible, for example, to transfer the processing for a particular function from one of the functional elements described herein to another functional element without changing the inventive operation of the system. In many cases, the place of implementation (i.e., the functional element) described herein is merely a designer's preference and not a hard requirement.

Moreover, control channels in newer GSM-based systems, such as UMTS, are known as access channels whereas data or voice channels are known as traffic channels, where such access and traffic channels may share the same frequency band and modulation scheme but be separated by code. Within this specification, a general reference to control and access channels, or voice and data channels, shall refer to all types of control or voice and data channels, whatever the preferred terminology for a particular air interface. Furthermore, given the many types of air interfaces (e.g., IS-95 CDMA, CDMA 2000, UMTS, and W-CDMA) used throughout the world, this specification does not exclude any air interface from the inventive concepts described herein. Those skilled in the art will recognize other interfaces used elsewhere are derivatives of or similar in class to those described above. Accordingly, except as they may be expressly so limited, the scope of protection of the following claims is not intended to be limited to the specific embodiments described above.

What is claimed:

1. A signal processing method for use in processing a base transceiver station (BTS) downlink signal, comprising:
- acquiring a candidate time series from a received BTS downlink burst signal;
- correlating a frequency correction channel (FCCH) replica with a candidate broadcast control channel (BCCH) beacon signal to determine a nominal frame time alignment and time of arrival (TOA) for an FCCH burst signal;
- correlating a synchronization channel (SCH) extended training sequence to determine a time alignment and TOA for an SCH burst signal;
- attempting to demodulate the SCH burst signal;
- determining that the SCH demodulation is not acceptable, and in response thereto performing the following steps:
  - obtaining A-bis monitoring system (AMS)-derived possible partial/modulo frame and associated BSIC information for the candidate BCCH signal;
  - calibrating the AMS-derived timings to GPS-based times for possible partial/modulo frames, and using the candidate AMS-derived partial/modulo frame information to form the possible complete frame numbers (FNs) with associated reduced frame numbers (RFNs) for the SCH;
  - applying selected BSIC and FN/RFN to form a complete SCH replica; correlating the SCH replica with a candidate BCCH signal to refine the TOA measurement for the SCH burst signal;
  - integrating the SCH correlation with an associated FCCH correlation for a refined measurement of TOA;
  - determining that the correlation results are acceptable and propagating a measured GPS-timebased TOA to a frame boundary, thereby determining a measured GPS-timebased TOA corresponding to a frame boundary; and
  - forming a record of correlated BCCH carrier identification, BSIC, FN, and GPS-timebased TOA.

2. A signal processing system for use in processing a base transceiver station (BTS) downlink signal, comprising a processor and executable instructions for configuring the processor to perform a sequence of predefined steps, said steps including:
- acquiring a candidate time series from a received BTS downlink burst signal;
- correlating a frequency correction channel (FCCH) replica with a candidate broadcast control channel (BCCH) beacon signal to determine a nominal frame time alignment and time of arrival (TOA) for an FCCH burst signal;
- correlating a synchronization channel (SCH) extended training sequence to determine a time alignment and TOA for an SCH burst signal;
- attempting to demodulate the SCH burst signal;
- determining that the SCH demodulation is not acceptable, and in response thereto performing the following steps:
  - obtaining A-bis monitoring system (AMS)-derived possible partial/modulo frame and associated BSIC information for the candidate BCCH signal;
  - calibrating the AMS-derived timings to GPS-based times for possible partial/modulo frames, and using the candidate AMS-derived partial/modulo frame information to form the possible complete frame numbers (FNs) with associated reduced frame numbers (RFNs) for the SCH;
  - applying selected BSIC and FN/RFN to form a complete SCH replica; correlating the SCH replica with a candidate BCCH signal to refine the TOA measurement for the SCH burst signal;
  - integrating the SCH correlation with an associated FCCH correlation for a refined measurement of TOA;
  - determining that the correlation results are acceptable and propagating a measured GPS-timebased TOA to a frame boundary, thereby determining a measured GPS-timebased TOA corresponding to a frame boundary; and
  - forming a record of correlated BCCH carrier identification, BSIC, FN, and GPS-timebased TOA.

* * * * *

UNITED STATES PATENT AND TRADEMARK OFFICE
CERTIFICATE OF CORRECTION

PATENT NO. : 7,593,738 B2　　　　　　　　　　　　　　　　　　　　　　　　　Page 1 of 1
APPLICATION NO. : 11/321893
DATED : September 22, 2009
INVENTOR(S) : Robert J. Anderson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Twenty-eighth Day of September, 2010

David J. Kappos
*Director of the United States Patent and Trademark Office*